(12) United States Patent
Hano et al.

(10) Patent No.: US 6,385,524 B2
(45) Date of Patent: May 7, 2002

(54) AUTOMOTIVE BRAKE CONTROL SYSTEM WITH ANTI-SKID BRAKING DEVICE

(75) Inventors: Sunao Hano; Tamotsu Yamaura; Gen Inoue; Nobuyuki Ohtsu, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/802,859

(22) Filed: Mar. 12, 2001

(30) Foreign Application Priority Data

Mar. 16, 2000 (JP) ........................................ 2000-073733

(51) Int. Cl.[7] ................................................ B60T 8/58
(52) U.S. Cl. ............................. 701/80; 701/70; 701/72
(58) Field of Search ........................... 701/80, 72, 70, 701/71, 73, 78, 81; 303/146

(56) References Cited

U.S. PATENT DOCUMENTS 5,498,072 A * 3/1996 Shimizu ...................... 303/191
6,026,343 A * 2/2000 Ogino ........................... 701/72

FOREIGN PATENT DOCUMENTS

JP          3-79460          4/1991

* cited by examiner

*Primary Examiner*—William A. Cuchlinski, Jr.
*Assistant Examiner*—Marthe Y. Marc-Coleman
(74) *Attorney, Agent, or Firm*—Foley & Lardner

(57) ABSTRACT

An automotive brake control system with an anti-brake skid (ABS) unit which controls a wheel-brake cylinder pressure to each individual wheel cylinder of the road wheels to prevent a wheel lock-up condition during braking, and an ABS control unit being configured to be connected electrically to at least wheel speed sensors and the ABS unit to execute skid control having at least a reduce-pressure operating mode and a pressure build-up operating mode, when the wheel speed sensor signals indicate that at least one of the road wheels is locking up. The ABS control unit includes a road-surface-condition change determination section which determines, based on both a time length of brake-fluid-pressure control continuously executed during the skid control and a recovery acceleration of the wheel speed of the road wheel subjected to the skid control, whether there is a road-surface $\mu$ change from low-$\mu$ road to high-$\mu$ road.

21 Claims, 15 Drawing Sheets

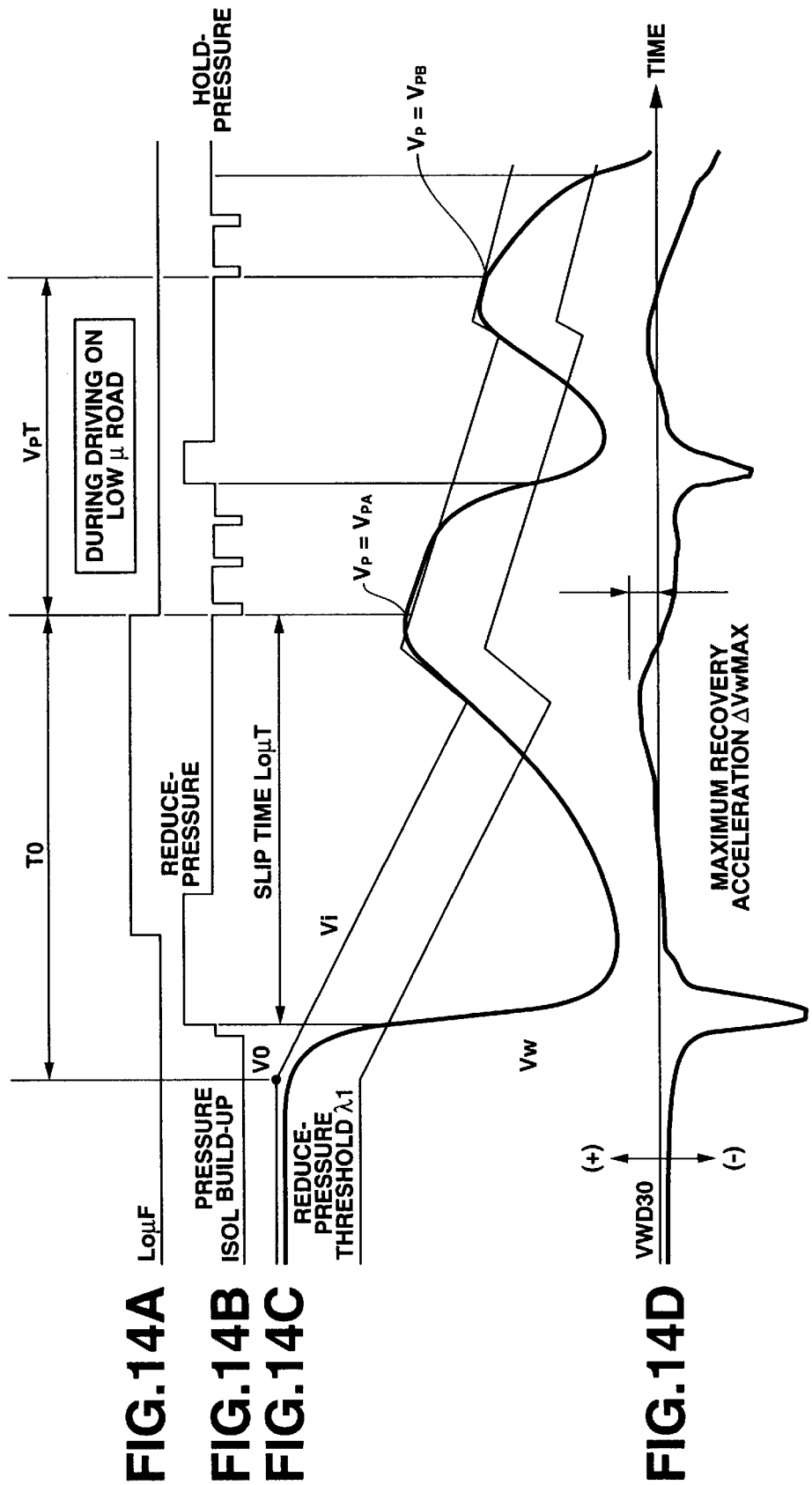

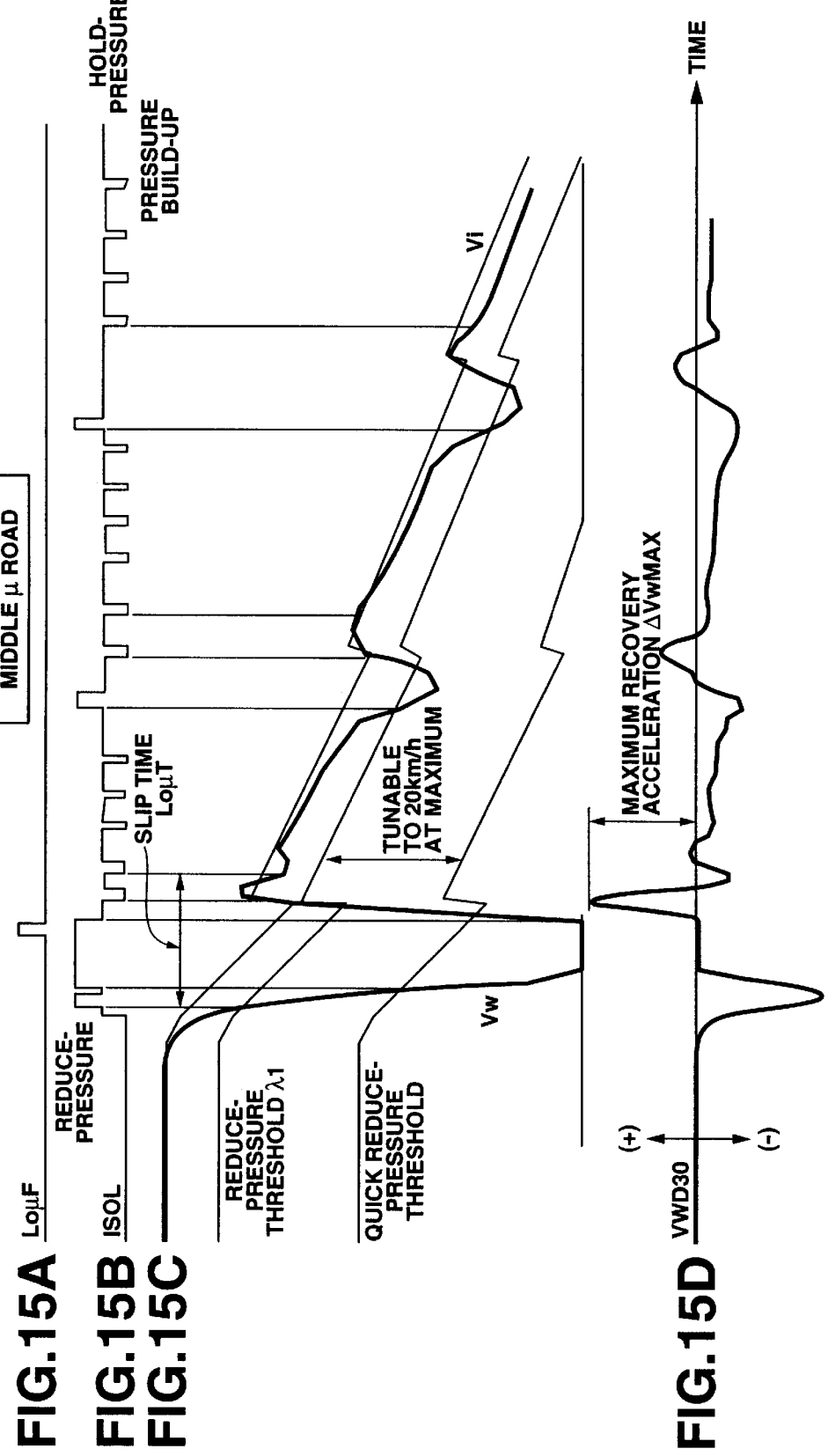

AUTOMOTIVE BRAKE CONTROL SYSTEM WITH ANTI-SKID BRAKING DEVICE

TECHNICAL FIELD

The present invention relates to an automotive brake control system with an anti-skid braking device (ABS unit) which acts to prevent a wheel lock-up condition during braking and to provide maximum effective braking, and particularly to such an anti-skid braking system (ABS system) capable of variably controlling a rate of pressure build-up depending on the changes in road conditions, that is, a friction coefficient of the road surface.

BACKGROUND ART

ABS systems usually employ rotational wheel speed sensors that monitor each wheel's rotational speed and send a signal back to an on-board computer to indicate a deceleration rate of each wheel. If the wheel speed sensor signals indicate that a wheel or wheels are locking up, the ABS device comes into operation to momentarily reduce a wheel-brake cylinder pressure of the wheel subjected to skid control and thereafter to again build up the wheel-cylinder pressure when the wheel speed recovers near to the vehicle speed and thus there is no risk of the wheels to lock up. In this manner, the ABS system operates to prevent skidding and to shorten a braking distance as much as possible, and thus to provide maximum effective braking during anti-skid operation. In recent years, there have been proposed and developed various ABS systems in which a rate of pressure build-up following the pressure-reduction operating mode (or reduce-pressure mode) can be varied depending upon road surface conditions, during skid control. In such ABS systems, the rate of pressure build-up is determined or set depending on the road-surface friction coefficient (hereinafter is referred to as a "road-surface $\mu$"), and thus it is possible to provide the shortest possible braking distance without incurring wheel lock-up and vehicle skidding, during braking on both a high-$\mu$ road surface condition (e.g., dry pavement) and a low-$\mu$ road surface condition (e.g., snow or icy roads). For instance, during braking on the high-$\mu$ road, it is required to set the rate of pressure build-up following the reduce-pressure mode at a comparatively great value, so as to properly reduce a recovery time that the wheel-brake cylinder pressure recovers near to a suitable brake fluid pressure, and thus to shorten the stopping distance. Conversely, during braking on the low-$\mu$ road, it is required to set the rate of pressure build-up at a comparatively small value, so as to prevent the wheel from again starting to lock due to an improperly high pressure build-up rate during one cycle of the pressure build-up mode. Skid control based on the relatively great pressure build-up rate programmed to be suitable for the high-$\mu$ road surface condition is often called as a high-$\mu$ control mode (simply, high-$\mu$ control), whereas skid control based on the relatively small pressure build-up rate programmed to be suitable for the low-$\mu$ road surface condition is often called as a low-$\mu$ control mode (simply, low-$\mu$ control). On a moment's thought, the road surface conditions are not constant. That is, during vehicle driving, low-$\mu$ roads are usually sprinkled or dispersed. Therefore, there is an increased tendency for the road surface condition to change from the low-$\mu$ road surface condition to the high-$\mu$ road surface condition.

SUMMARY OF THE INVENTION

It is an object of the invention to provide an automotive brake control system with an anti-skid braking device, which is capable of accurately detecting a difference between low-$\mu$ road and high-$\mu$ a road.

In order to accomplish the object of the present invention, an automotive brake control system comprises vehicle sensors which detect at least each wheel speed of road wheels to generate wheel speed sensor signals, an anti-brake skid unit which controls a wheel-brake cylinder pressure to each individual wheel cylinder of the road wheels to prevent a wheel lock-up condition during braking, a control unit being configured to be connected electrically to the vehicle sensors and the anti-brake skid unit to execute skid control having at least a reduce-pressure operating mode and a pressure build-up operating mode, when the wheel speed sensor signals indicate that at least one of the road wheels is locking up, the control unit comprising a road-surface-condition change determination section which determines, based on both a time length of brake-fluid-pressure control continuously executed during the skid control and a recovery acceleration of the wheel speed of the road wheel subjected to the skid control, whether there is a change of a road surface condition from a road surface having a low friction coefficient to a road surface having a high friction coefficient.

According to another aspect of the invention, an automotive brake control system comprises vehicle sensors for detecting at least each wheel speed of road wheels to generate wheel speed sensor signals, an anti-brake skid unit for controlling a wheel-brake cylinder pressure to each individual wheel cylinder of the road wheels to prevent a wheel lock-up condition during braking, a control unit being configured to be connected electrically to the vehicle sensors and the anti-brake skid unit to execute skid control having at least a reduce-pressure operating mode and a pressure build-up operating mode, when the wheel speed sensor signals indicate that at least one of the road wheels is locking up, the control unit comprising a road-surface-condition change determination means for determining, based on both a time length of brake-fluid-pressure control continuously executed during the skid control and a recovery acceleration of the wheel speed of the road wheel subjected to the skid control, whether there is a change of a road surface condition from a road surface having a low friction coefficient to a road surface having a high friction coefficient.

According to a still further aspect of the invention, an automotive brake control system comprises vehicle sensors which detect at least each wheel speed of road wheels to generate wheel speed sensor signals, an anti-brake skid unit which controls a wheel-brake cylinder pressure to each individual wheel cylinder of the road wheels to prevent a wheel lock-up condition during braking, a control unit being configured to be connected electrically to the vehicle sensors and the anti-brake skid unit to execute skid control having at least a reduce-pressure operating mode and a pressure build-up operating mode, when the wheel speed sensor signals indicate that at least one of the road wheels is locking up, the control unit comprising a road-surface-condition change determination section which determines, based on both a time length of brake-fluid-pressure control continuously executed during the skid control and a recovery acceleration of the wheel speed of the road wheel subjected to the skid control, whether there is a change of a road surface condition from a road surface having a low friction coefficient to a road surface having a high friction coefficient, the road-surface-condition change determination section being provided individually for at least left and right wheels of the road wheels.

The other objects and features of this invention will become understood from the following description with reference to the accompanying drawings.

BRIEF DESCRIPTION OF THE DRAWINGS

FIGS. 14A–14D are time charts illustrating simulation test results obtained by the ABS system of the embodiment capable of performing the routine shown in FIG. 12, during driving on low-$\mu$ road.

FIGS. 15A–15D are time charts illustrating simulation test results obtained by the ABS system of the embodiment capable of performing the routine shown in FIG. 12, during driving on middle-$\mu$ road.

DESCRIPTION OF THE PREFERRED EMBODIMENTS

Figure 1:
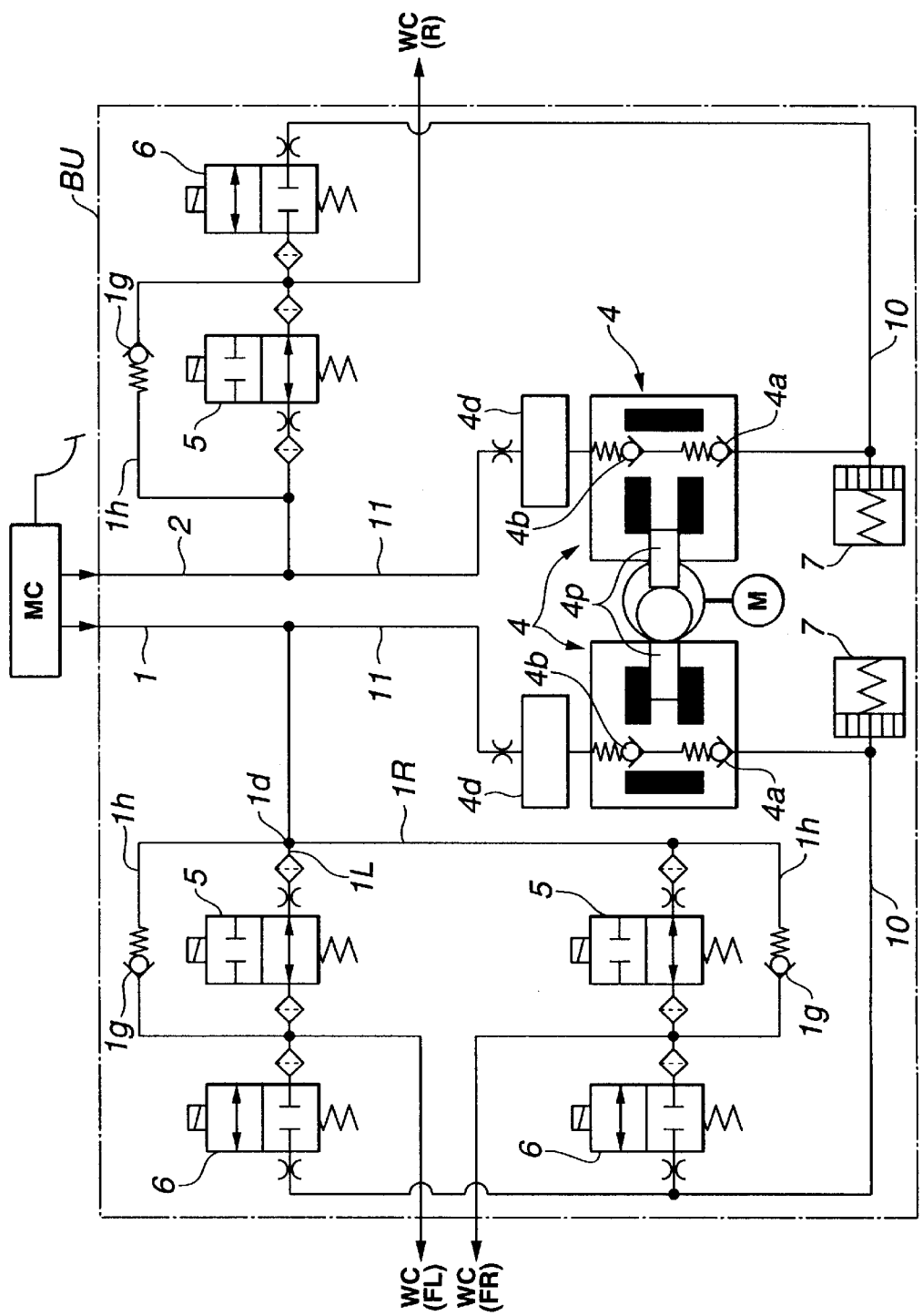
FIG. 1 is a system block diagram illustrating one embodiment of an ABS unit of the automotive brake control system of the invention.

Referring now to the drawings, particularly to FIG. 1, the automotive brake control system of the invention is exemplified in an automotive vehicle equipped with a three-channel ABS front-rear split brake-circuit layout. In FIG. 1, WC denotes a wheel cylinder. Reference signs FL, FR, and R in parentheses are inserted at the underside of reference sign WC to indicate front-left, front-right, and rear wheel-brake cylinders, respectively. Actually, the rear section of the dual braking system includes rear-left and rear-right wheel cylinders and two hydraulic brake circuits for them. For the purpose of illustrative simplicity, regarding the rear section of the dual braking system, FIG. 1 merely shows only one rear wheel-brake cylinder $WC_{(R)}$ and its rear-brake hydraulic circuit. This is because in the three-channel ABS system for parallel brake-circuit division the rear brakes are controlled together. As will be hereinafter described in detail, the fundamental concept of the invention can be applied to a four-channel ABS system in which the front brakes are controlled individually and also the rear brakes are controlled individually. The front wheel-brake cylinders $WC_{(FL)}$ and $WC_{(FR)}$ are fluidly connected through a hydraulic brake circuit 1 to a master cylinder MC (constructed by a typical tandem master cylinder with two pistons in tandem), while the rear wheel-brake cylinders $WC_{(RL)}$ and $WC_{(RR)}$ are fluidly connected through a hydraulic brake circuit 2 to the master cylinder MC. The hydraulic brake circuit 1, which is included in the primary section (front section) and extends towards the front-left and front-right wheel-brake cylinders $WC_{(FL)}$ and $WC_{(FR)}$, is divided at the branch point 1d into two branch circuits 1L and 1R associated with the respective front wheel cylinders $WC_{(FL)}$ and $WC_{(FR)}$. An inflow valve 5 is fluidly disposed in each of the branch circuits 1L and 1R. In the same manner, an inflow valve 5 is fluidly disposed in the rear brake circuit 2. The inflow valve 5 is often called as a "pressure build-up valve". Each of the three inflow valves 5 is comprised of a normally-open, two-port two-position, electromagnetic directional control valve. Therefore, when de-energized, the inflow valve 5 is held at its open position by way of the bias of a return spring. Conversely, when energized, the inflow valve 5 is shifted to its closed position against the spring bias by way of electromagnetic force created by the electromagnetic solenoid. Reference sign 1h denotes a bypass line bypassing the associated inflow valve 5. A one-way check valve 1g is fluidly disposed in each of the three bypass lines 1h to permit brake-fluid flow from the downstream side (the wheel-cylinder side) to the upstream side (the master-cylinder side) in one direction only. A drain circuit 10 for the primary section is connected to the downstream side of each of the two inflow valves 5 associated with the front wheel cylinders $WC_{(FL)}$ and $WC_{(FR)}$ for communicating the front brake circuit 1 with a reservoir 7 therethrough. Likewise, a drain circuit 10 for the secondary section is connected to the downstream side of the one inflow valve 5 associated with the rear wheel cylinder $WC_{(R)}$ for communicating the rear brake circuit 2 with a reservoir 7 therethrough. Two outflow valves 6 are fluidly disposed in the drain circuit 10 of the primary section in such a manner as to be connected to the outlets of the front-left and front-right inflow valves 5. In the same manner, an outflow valve 6 is fluidly disposed in the drain circuit 10 of the secondary section in such a manner as to be connected to the outlet of the rear inflow valve 5. The outflow valve 6 is often called as a "reduce-pressure valve". Each of the outflow valves 6 is comprised of a normally-closed, two-port two-position, electromagnetic directional control valve. Therefore, when de-energized, the outflow valve 6 is held at its closed position by way of the bias of a return spring so as to shut off the associated drain circuit 10. Conversely, when energized, the outflow valve 6 is shifted to its open position against the spring bias by way of electromagnetic force created by the electromagnetic solenoid so as to establish fluid-communication between the associated drain circuit 10 and inflow valve 5. The drain circuit 10 of the primary section is connected through a reflux circuit 11 to the front brake circuit 1 upstream of the front-left and front-right inflow valves (5, 5). On the other hand, the drain circuit 10 of the secondary section is connected through a reflux circuit 11 to the rear brake circuit 2 upstream of the rear inflow valve 5. A pair of return pumps (4, 4), often called "ABS pumps", are provided in the two reflux circuits (11, 11), so as to return the brake fluid stored in the reservoirs (7, 7) into the respective brake circuits 1 and 2. Each of the return pumps (4, 4) is comprised of a reciprocating plunger type pump in which a volumetric capacity of a working chamber is variable by reciprocating motion of a plunger 4p, to suck and discharge the brake fluid. The plunger type return pumps (4, 4) are driven by means of a motor M with an eccentric rotary cam. A one-way inflow check valve 4a is provided in the inlet side of each of the return pumps (4, 4). A one-way outflow check valve 4b is provided in the discharge side of each of the return pumps (4, 4). A damper 4d is further provided in the discharge side of each of the return pumps (4, 4) to effectively absorb or attenuate pulsation of brake fluid discharged. In FIG. 1, a portion, denoted by reference sign BU and contained within one-dotted line, corresponds to the ABS unit (anti-brake skid unit). The ABS unit is usually housed in a hydraulic control unit (HCU) housing (not shown).

Figure 2:
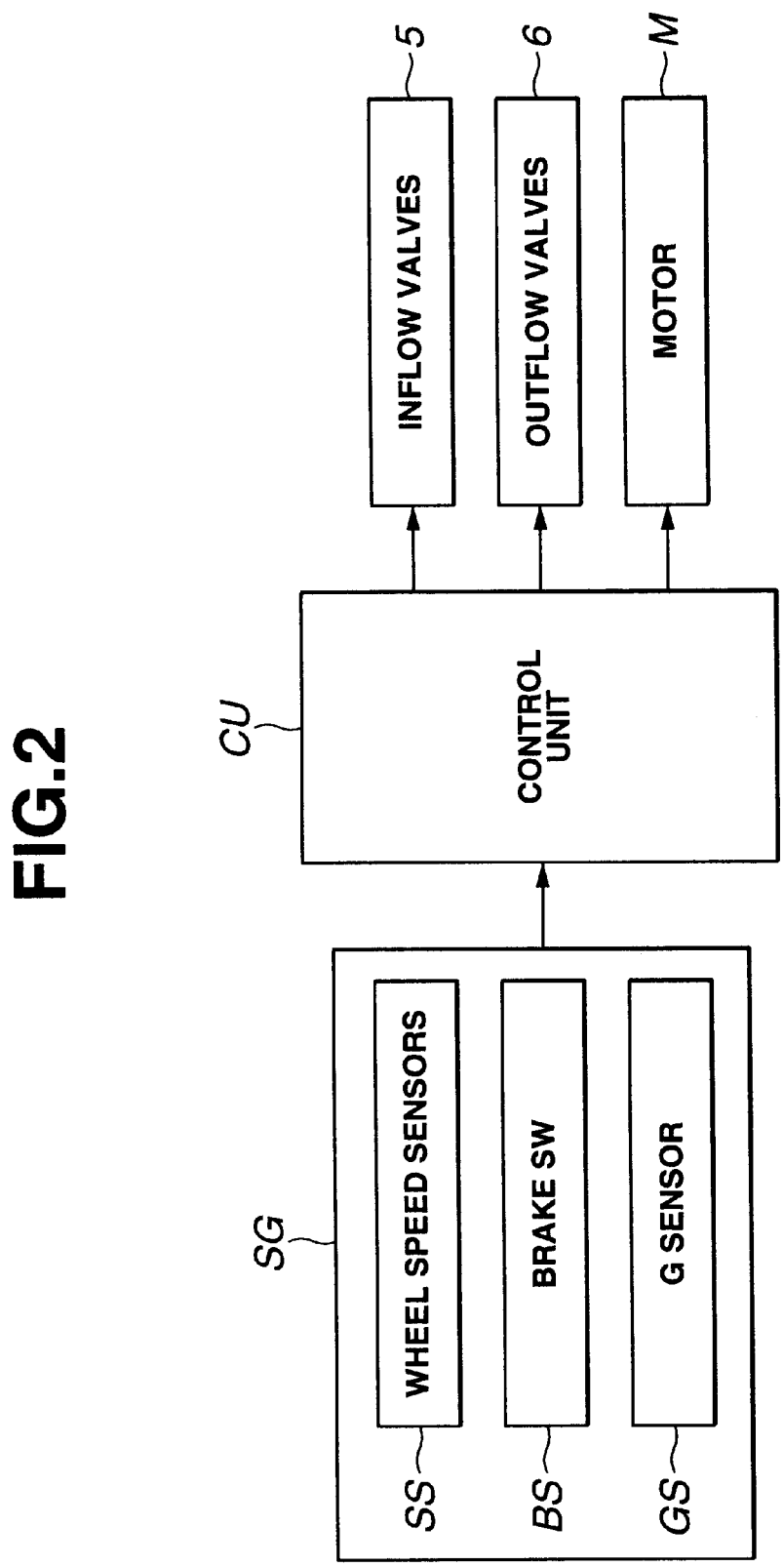
FIG. 2 is a block diagram illustrating electronic brake control unit (ECU) inputs and outputs employed in the automotive brake control system of the embodiment.
Figure 3:
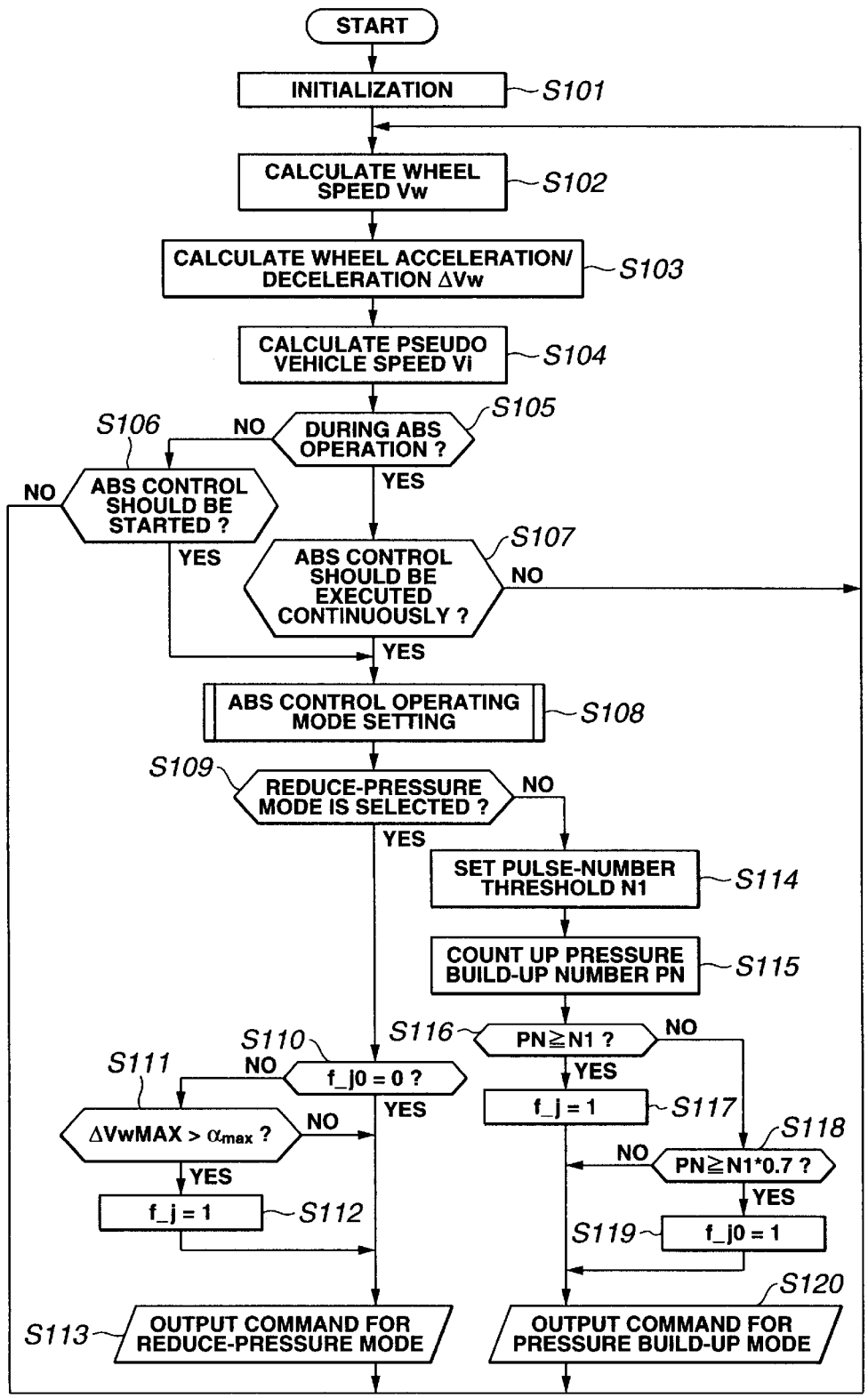
FIG. 3 is a flow chart illustrating a main ABS control flow executed by the ABS system of the embodiment.
Figure 4:
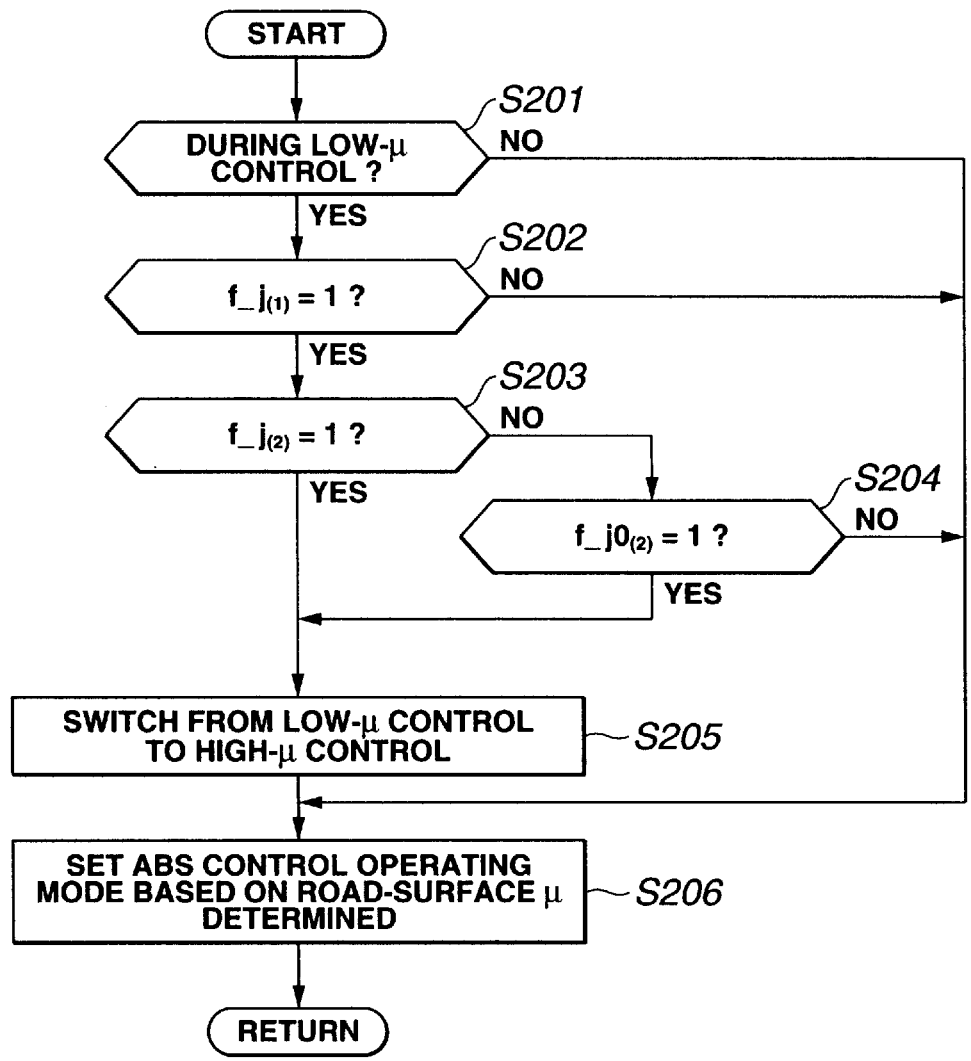
FIG. 4 is a flow chart illustrating a control mode setting subroutine executed by the ABS system of the embodiment and related to step S108 of FIG. 3.

With the previously-noted arrangement, as the brake pedal is depressed, the piston in the master cylinder MC applies pressure to brake fluid. The pressure forces the brake fluid through the inlet/outlet port of the master cylinder MC into the hydraulic brake circuits (1, 2). During normal braking, in the ABS unit BU, the inflow valves (5, 5, 5) are kept at their open positions and at the same time the outflow valves (6, 6, 6) are kept at their closed positions, and thus hydraulic pressure (master-cylinder pressure) is applied via the hydraulic brake circuit (1, 2) through the inflow and outflow valves (5, 6) to the wheel-brake cylinders $WC_{(FL)}$, $WC_{(FR)}$, and $WC_{(R)}$. During skid control, in order to properly regulate or control the brake-fluid pressure to each of the wheel-brake cylinders, the inflow and outflow valves (5, 6) are designed to switch among at least three operating modes, namely a reduce-pressure mode where the inflow valve 5 of the wheel subjected to skid control (hereinafter is referred to as "skid-controlled wheel") is held at the closed position and the outflow valve 6 of the skid-controlled wheel is held at the open position to relieve the brake fluid in the wheel-brake cylinder WC via the drain circuit 10 within toward the reservoir 7 and consequently to reduce the wheel-cylinder pressure, a hold-pressure mode where the inflow valve 5 of the skid-controlled wheel remains closed and the outflow valve 6 of the skid-controlled wheel is also shifted to the closed position to shut off the brake circuit (1, 2) and consequently to hold the brake-fluid pressure in the wheel-brake cylinder WC constant, and a pressure build-up mode where the inflow valve 5 of the skid-controlled wheel is shifted to the open position and the outflow valve 6 of the skid-controlled wheel remains closed and consequently the upstream side (the master-cylinder side) of the brake circuit (1, 2) is communicated with the downstream side (the wheel-brake cylinder side) of the brake circuit (1, 2) to build up the wheel-cylinder pressure. The brake-fluid reservoir 7 is designed to temporarily store energy by holding the surplus brake fluid, which will occur anytime that there is a drop in system pressure (especially during the pressure-reduction mode). The return pump (4, 4) is designed to carry or return the brake fluid flowing from the wheel-brake cylinders via the individual reservoirs into the correct circuit of the master cylinder (i.e., the upstream side of the directional control valve 5) during skid control. With the previously arrangement of the ABS system shown in FIG. 1, the brake-fluid pressure to each wheel-brake cylinder can be properly regulated or controlled. The operation (switching among valve positions) of the directional control valves (5, 6) associated with each wheel-brake cylinder ($WC_{(FL)}$, $WC_{(FR)}$, $WC_{(R)}$) and the operation (switching between inoperative and operative states) of the motor M of the return pumps (4, 4) are electrically controlled by means of the ABS system electronic control unit (ECU or CU). Electronic control unit CU usually comprises a microcomputer. Although it is not clearly shown in FIG. 2, the electronic control unit CU includes a central processing unit (CPU) that performs necessary arithmetic-calculations, processes informational data, compares signals from a group of engine/vehicle sensors and switches SG to preprogrammed threshold values, and makes necessary decisions of acceptance, memories (RAM, ROM), and an input/output interface. Actually, the control unit CU performs various data processing actions as shown in FIGS. 3 and 4 which will be fully described later. The input interface of control unit CU receives input informational data from various engine/vehicle sensors/switches SG, that is, three wheel speed sensors (SS, SS, SS), a brake switch BS, and an acceleration sensor GS. The three wheel speed sensors SS placed at the respective road wheels (FL, FR, R) are provided to continuously monitor or detect each individual wheel's rotational speed and relay this signal to the input interface of electronic control unit CU. Brake switch BS is designed to generate a switched-ON signal (or a high-voltage signal) when the brake pedal is depressed and thus the brakes are applied. Conversely, when the brake pedal is undepressed and thus the brakes are released, the input interface of CU receives a switched-OFF signal (or no electrical signal) from the brake switch BS. Acceleration sensor GS is provided to monitor or detect the longitudinal acceleration exerted on the vehicle (corresponding to a component of the vector acceleration of a point in the vehicle in the X-direction and the lateral acceleration exerted on the vehicle (corresponding to a component of the vector acceleration of a point in the vehicle perpendicular to the vehicle x-axis and parallel to the road plane). The memories store preprogrammed or predetermined data such as various threshold values and temporarily stores the results of arithmetic-calculations and the necessary decisions made by the CPU. The output interface of CU is configured to be electronically connected to each of the directional control valves (5, 6), to produce a control command signal to the directional control valve associated with each individual wheel-brake cylinder as well as the return pumps (4, 4), on the basis of the results of arithmetic-calculations and decisions performed by the CPU.

Hereunder described in detail in reference to the flow chart shown in FIG. 3 is the main skid control routine executed by the brake control system of the embodiment and preprogrammed in the CPU of electronic control unit CU. The control routine shown in FIG. 3 is executed as time-triggered interrupt routines to be triggered every predetermined time intervals.

At step S101, data stored in the memories, in particular RAM are all initialized.

At step S102, the more recent wheel speed indicative data signals (that is, the latest up-to-date information being received from the three wheel speed sensors SS), are read, and then a wheel speed Vw at each road wheel (a front-right wheel speed VwFR, a front-left wheel speed VwFL, and a rear wheel speed VwR) is arithmetically calculated.

Then, at step S103, an acceleration/deceleration rate (simply an acceleration/deceleration ΔVw) at each road wheel, that is, a time rate of change in each of the wheel speeds VwFL, VwFR and VwR (a front-right wheel acceleration/deceleration ΔVwFR, a front-left wheel acceleration/deceleration ΔVwFL, and a rear wheel acceleration/deceleration ΔVwR) is arithmetically calculated.

At step S104, a pseudo vehicle speed Vi is computed or determined by a predetermined or pre-programmed arithmetic processing. For example, the pseudo vehicle speed Vi can be determined as the highest one of all of the wheel speeds (VwFL, VwFR, VwR). Alternatively, the pseudo vehicle speed Vi may be determined as the higher one of the driven wheel speeds.

At step S105, a test is made to determine whether the ABS system is in operation. When the answer to step S105 is in the negative (NO), that is, the ABS system in conditioned in the inoperative state, step S106 occurs. At step S106, a check is made to determine whether or not skid control should be started. Actually, the check of step S106 is based on the ABS operating mode determined at step 108 (described later). When the answer to step S106 is negative, the routine returns to step S102. Conversely, when the answer to step S106 is affirmative, the routine proceeds from step S106 to step S108. On the other hand, when the answer to step S105 is in the affirmative (YES), that is, the ABS system is in operation, step S107 occurs. At step S107, a check is made to determine whether the skid control should be executed continuously. When the answer to step S107 is negative (NO), the routine flows from step S107 to step S102 to terminate the skid control. Conversely, when the answer to step S107 is affirmative (YES), the routine proceeds from step S107 to step S108. At step S108, first, a road condition (that is, a road-surface $\mu$) of the road surface on which the vehicle is now running is decided or determined, as described later. Secondly, one of the three operating modes of skid control, namely the reduce-pressure mode, hold-pressure mode, and pressure build-up mode, is selected depending on wheel speeds Vw, acceleration/deceleration rates $\Delta$Vw, pseudo vehicle speed Vi. Thirdly, the presence or absence of the so-called $\mu$ jump, that is, the absence or presence of the road-surface $\mu$ change from low-$\mu$ to high-$\mu$ is determined, as will be fully described later in reference to the flow chart shown in FIG. 4.

After step S108, step S109 occurs. At step S109, a check is made to determine whether the reduce-pressure operating mode is selected. When the answer to step S109 is affirmative (YES), step S110 occurs. Conversely, when the answer to step S109 is negative (NO), step S114 occurs. Although it is not shown in the flow chart of FIG. 3, a hold-pressure mode decision box is provided between steps S109 and S114, so as to check whether the hold-pressure mode is selected. When the hold-pressure mode is selected, the CU outputs command signals corresponding to the hold-pressure operating mode to the inflow and outflow solenoid valves. Conversely, when the answer to step S109 is negative and additionally the answer to the hold-pressure mode decision box (not shown) is negative, step S114 occurs. For the purpose of illustrative simplicity, the hold-pressure mode decision box is omitted.

At step S110, a check is made to determine whether a temporary low-to-high-$\mu$ mode-switching flag f_j0 is reset to "0". The setting or resetting of the temporary low-to-high-$\mu$ mode-switching flag f_j0 is dependent on the result of comparison between the number PN of pressure build-up and 70% of a pulse-number threshold value N1 (described later). As will be fully discussed later, the temporary low-to-high-$\mu$ mode-switching flag f_j0 is necessary to reset the pressure build-up start timing of the wheel-brake cylinder corresponding to a slower one of the left and right wheels, after the reduce-pressure operating mode of skid control. When the temporary low-to-high-$\mu$ mode-switching flag f_j0 is set to "1", step S111 occurs. Conversely, when the temporary low-to-high-$\mu$ mode-switching flag f_j0 is reset to "0", the routine proceeds from step S110 to step S113. At step S113, the CU generates command signals corresponding to the reduce-pressure operating mode to the inflow and outflow solenoid valves.

At step S111, a test is made to determine whether a maximum wheel acceleration $\Delta$VwMAX exceeds a predetermined acceleration threshold value (or a specified acceleration threshold value) $\alpha_{max}$. The maximum wheel acceleration $\Delta$VwMAX means a maximum value of a wheel recovery acceleration that the wheel speed Vw of the skid-controlled road wheel increases and recovers to the pseudo vehicle speed Vi during the reduce-pressure mode of skid control. Thus, the predetermined acceleration threshold value $\alpha_{max}$ is often called a "recovery acceleration threshold $\alpha_{max}$". In case of $\Delta$VwMAX>$\alpha_{max}$, the routine proceeds from step S111 to step S112. At step S112, a low-to-high-$\mu$ mode-switching flag f_j is set to "1". As discussed above, in case of f_j0=1, or in case of f_j0=0 and $\Delta$VwMAX$\leq\alpha_{max}$, or after the low-to-high-$\mu$ mode-switching flag f_j has been set at step S112, the routine proceeds to step S113, so as to output command signals corresponding to the reduce-pressure operating mode to the inflow and outflow solenoid valves. Note that the low-to-high-$\mu$ mode-switching flag f_j is different from the temporary low-to-high-$\mu$ mode-switching flag f_j0. As will be fully discussed later, the low-to-high-$\mu$ mode-switching flag f_j is also needed to reset the pressure build-up start timing of the wheel-brake cylinder, after the reduce-pressure operating mode of skid control. The aforementioned predetermined acceleration threshold value amp corresponds to a minimum acceleration value necessary for the wheel speed Vw to recover to the pseudo vehicle speed (the vehicle speed) Vi during execution cycle of the ABS reduce-pressure mode on a high-$\mu$ road. The specified acceleration threshold value $\alpha_{max}$ is actually set as a variable value based on the slip time interval (Lo$\mu$T) from the time when the wheel speed Vw is reduced to below the reduce-pressure threshold value $\lambda$1 below which the reduce-pressure operating mode of the skid control is started to the time when the wheel speed recovers near to the vehicle speed (pseudo vehicle speed Vi) in accordance with the reduce-pressure operating mode (see FIG. 13). In the system of the shown embodiment, the predetermined acceleration threshold value $\alpha_{max}$ is set to an acceleration value ranging from 3G to 4G (where G means a gravitational acceleration unit).

On the other hand, when the answer to step S109 is negative (NO) and additionally the pressure build-up mode is selected, the routine proceeds from step S109 to step S114. At step S114, the pulse-number threshold value is set to a predetermined value N1. The pulse-number threshold value N1 is set to a predetermined value corresponding to a pressure-build-up time interval given when the pressure build-up is made according to the low-$\mu$ skid-control mode on a high-$\mu$ road. In the shown embodiment, the pulse-number threshold value N1 is set to "9". Threshold values N1 vary, depending on the specification, type, total weight and size of vehicle. After step S114, step S115 occurs. At step S115, the pressure build-up number PN is counted up. The number PN of pressure build-up corresponds to a time interval of pressure build-up from the start of pressure build-up to the end of pressure build-up. Then, at step S116, the pressure build-up number PN is compared to the pulse-number threshold value N1. In case of PN$\geq$N1, the routine proceeds to step S117. At step S117, the low-to-high-$\mu$ mode-switching flag f_j is set to "1". Conversely, in case of PN<N1, the routine proceeds from step S116 to step S118. At step S118, the pressure build-up number PN is compared to a predetermined value N1*0.7 slightly smaller than the pulse-number threshold value N1. In the system of the embodiment, the predetermined value N1*0.7 is set to 70% of the pulse-number threshold value N1. In case of PN$\geq$N1*0.7, the routine proceeds from step S118 to step S119. At step S119, the temporary low-to-high-$\mu$ mode-switching flag f_j0 is set to "1". Conversely, in case of PN<N1*0.7, the routine proceeds from step S118 to step S120. At step S120, the CU outputs command signals corresponding to the pressure build-up operating mode to the inflow and outflow solenoid valves.

Details of the control mode setting subroutine executed at step S108 of FIG. 3 are hereunder described in detail in reference to the flow chart shown in FIG. 4.

Figure 12:
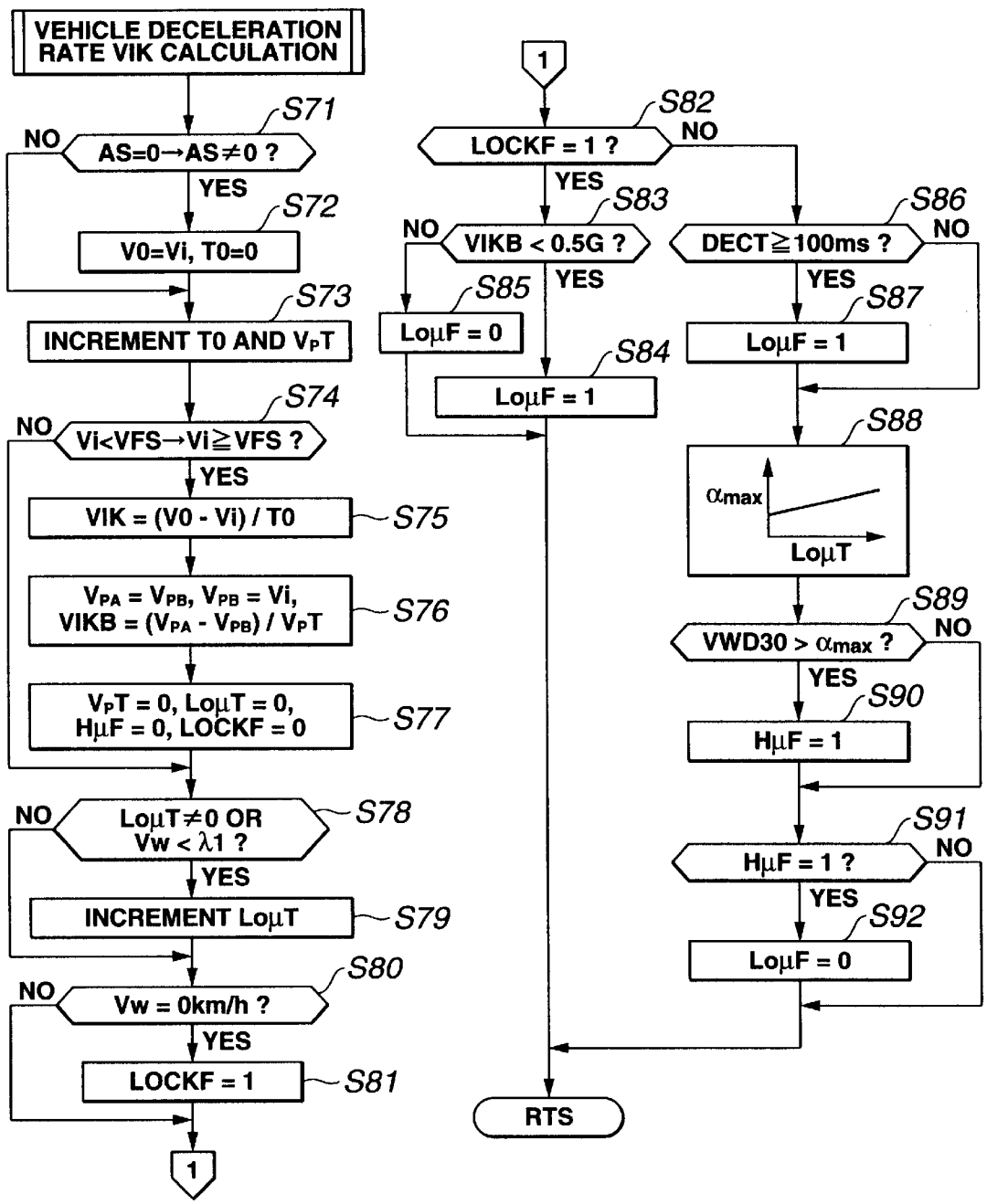
FIG. 12 is a flow chart illustrating a second arithmetic calculation for vehicle deceleration rate VIK.
Figure 13:
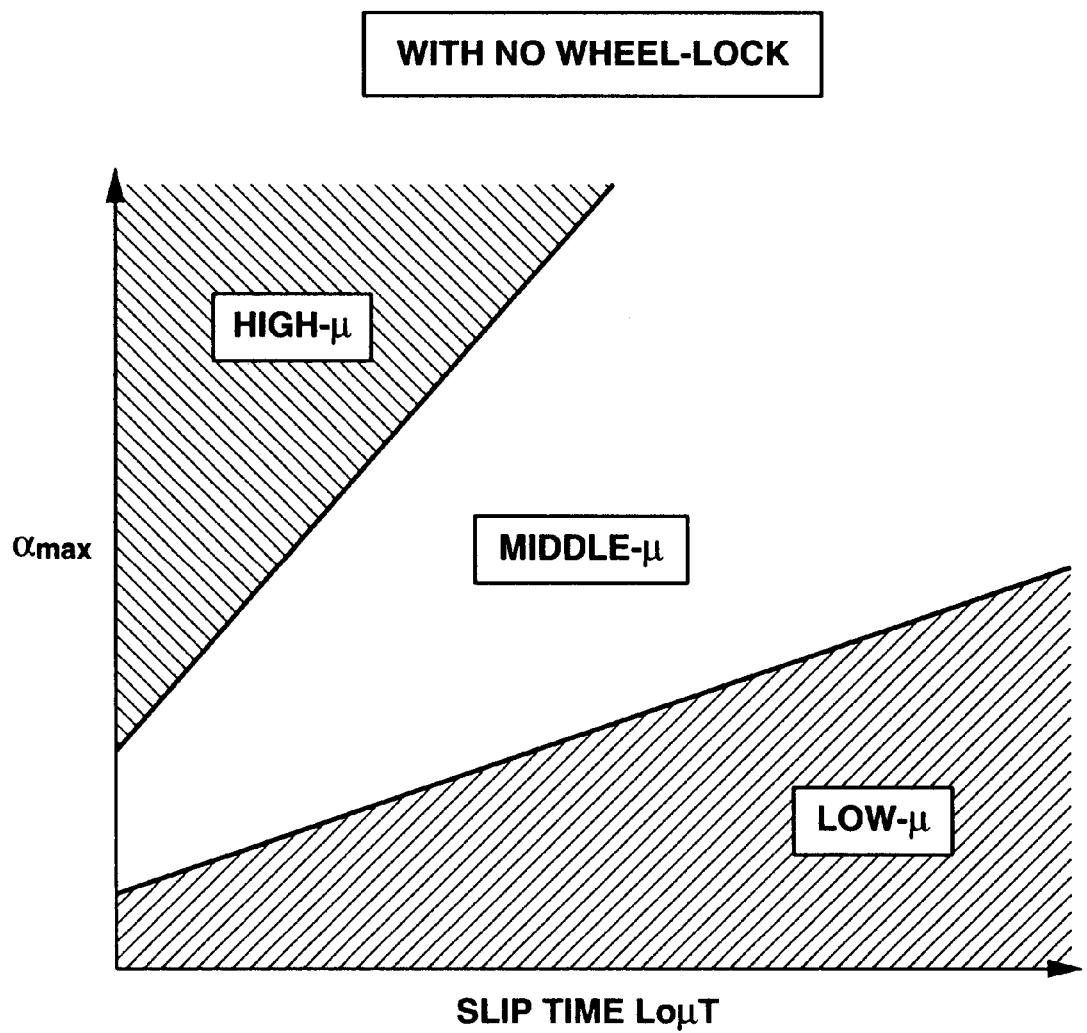
FIG. 13 is a preprogrammed recovery acceleration threshold value $\alpha_{max}$ versus slip time $Lo\mu T$ characteristic map.

Step S206 is a very important step. Thus, step S206 is discussed first of all. At step S206, either of the reduce-pressure mode and the pressure build-up mode is selected or set depending on the road surface condition, that is, the road-surface $\mu$ of the road surface on which the vehicle is now running. In the road-surface $\mu$ determination procedure of step S206, the CU measures a time interval T from a time when the pressure reduction starts to execute to a time when the start of pressure build-up is decided or judged, at the initial pressure build-up executed after the reduce-pressure mode. The time interval T is hereinafter referred to as a "recovery time of wheel speed" during which the wheel is skidding. The recovery time T essentially corresponds to a "slip time Lo$\mu$T" as shown in FIGS. 12 and 13. Thereafter, the processor of CU arithmetically calculates a road-surface-condition decision value DDM by dividing the maximum wheel acceleration (recovery acceleration) $\Delta$VwMAX by the recovery time T (Lo$\mu$T) measured. That is, the road-surface-condition decision value DDM is represented by the expression DDM=$\Delta$VwMAX/T. When the road-surface-condition decision value DDM is below a predetermined criterion, the CU determines that the road-surface $\mu$ of the road surface on which the vehicle is now running, is a low-$\mu$ road. When the road-surface-condition decision value DDM is above the predetermined criterion, the CU determines that the road-surface $\mu$ of the road surface on which the vehicle is now running, is a high-$\mu$ road. Instead of the use of a sole criterion distinguishing high-$\mu$ road from low-$\mu$ road, a first criterion distinguishing high-$\mu$ road from middle-$\mu$ road and a second criterion distinguishing middle-$\mu$ road from low-$\mu$ road may be used (see FIG. 13). In the system of the embodiment shown in FIGS. 3 and 4, in calculating the road-surface-condition decision value DDM, the recovery time T as well as the recovery acceleration $\Delta$VwMAX is used, and the recovery time T is put on the denominator, as can be seen from the expression DDM=$\Delta$VwMAX/T. Thus, even when the wheel acceleration/deceleration rate $\Delta$Vw is remarkably varied and affected by unevenness of the road surface or by superimposition of noise and thus the maximum wheel acceleration (recovery acceleration) $\Delta$VwMAX becomes great, a response (sensitivity) of determination for the road surface condition is optimized by way of the use of the recovery time T put on the denominator of the above expression. The high-accuracy road-surface-condition determination can be assured. Furthermore, in step S206 of FIG. 4 (or in step S108 of FIG. 3), a reduce-pressure threshold value $\lambda$1 and a hold-pressure threshold value $\lambda$2 are computed on the basis of the pseudo vehicle speed Vi computed at step S104 of FIG. 3. In selecting or determining the ABS operating mode, based on the parameters Vw, $\Delta$Vw, and Vi, comparison between the calculated reduce-pressure threshold value $\lambda$1 and each wheel speed Vw and comparison between the calculated hold-pressure threshold value $\lambda$2 and each wheel acceleration/deceleration $\Delta$Vw are made. In the shown embodiment, when a predetermined condition, that is, an inequality Vw<$\lambda$1 is satisfied, the electronic control unit CU selects the reduce-pressure mode. When an inequality Vw$\geq$$\lambda$1 and an inequality $\Delta$Vw$\geq$$\lambda$2 are both satisfied, the electronic control unit CU selects the pressure build-up mode. When the inequality Vw$\geq$$\lambda$1 and inequality $\Delta$Vw<$\lambda$2 are both satisfied, the electronic control unit CU selects the hold-pressure mode. That is, the wheel speed Vw becomes higher than the reduce-pressure threshold value $\lambda$1 and thus the wheel speed Vw approaches to the vehicle speed (i.e., the pseudo vehicle speed Vi), the ABS operating mode is shifted via the hold-pressure mode to the pressure build-up mode. As a result of the pressure build-up, when the wheel speed Vw becomes below the reduce-pressure threshold value $\lambda$1, the ABS operating mode is shifted again to the reduce-pressure mode. In this manner, the reduce-pressure mode, the hold-pressure mode, and the pressure build-up mode will repeat to prevent vehicle skidding. Note that, in the system of the embodiment shown in FIGS. 3 and 4, in the pressure build-up operating mode, the CU selects, depending on the road surface condition determined, one of a low-$\mu$ a control mode (low-$\mu$ control) that a pressure build-up rate of the initial pressure build-up is set to a relatively small pressure build-up rate programmed to be suitable for the low-$\mu$ road surface condition and a high-$\mu$ control mode (high-$\mu$ control) that a pressure build-up rate of the initial pressure build-up is set to a relatively great pressure build-up rate programmed to be suitable for the high-$\mu$ road surface condition. Additionally, note that in the system of the embodiment shown in FIGS. 3 and 4, in the pressure build-up operating mode, a timing of switching between low-$\mu$ control and high-$\mu$ control is dependent upon the temporary low-to-high-$\mu$ mode-switching flag f_j0 as well as the low-to-high-$\mu$ mode-switching flag f_j.

Steps S201 through S205 correspond to the road-surface $\mu$ change (the road-surface $\mu$ jump) determination procedure. This road-surface $\mu$ change determination procedure of steps S201–S205 is executed as soon as the CU determines the low-$\mu$ road and the low-$\mu$ control is started.

At step S201, a check is made to determine whether the ABS system is in the low-$\mu$ control. When the answer to step S201 is affirmative, that is, during the low-$\mu$ control, step S202 occurs. Conversely, when the ABS system is out of the low-$\mu$ control, that is, during high-$\mu$ control, step S206 occurs.

At step S202, a check is made to determine whether the low-to-high-$\mu$ mode-switching flag f_j for at least one of the front-left and front-right road wheels is set to "1". When the low-to-high-$\mu$ mode-switching flag f_j for at least one of the front-left and front-right road wheels is reset to "0", that is, in case of f_j$_{(1)}$=0 and f_j$_{(2)}$=0, the subroutine flows to step S206. Conversely, when the low-to-high-$\mu$ mode-switching flag f_j for at least one of the front-left and front-right road wheels is set to "1", that is, in case of f_j$_{(1)}$=1 and/or f_j$_{(2)}$=1, the subroutine flows to step S203. The flag f_j$_{(1)}$ means the low-to-high-$\mu$ mode-switching flag f_j for a first one of the front-left and front-right road wheels, whereas the flag f_j$_{(2)}$ means the low-to-high-$\mu$ mode-switching flag f_j for the second front road wheel.

At step S203, a check is made to determine whether the low-to-high-$\mu$ mode-switching flag f_j$_{(2)}$ for the second front road wheel is set to "1". When the second low-to-high-$\mu$ mode-switching flag f_j$_{(2)}$ is set, the subroutine proceeds from step S203 to step S205. At step S205, the processor of CU switches from the low-$\mu$ control to high-$\mu$ control. When the second low-to-high-$\mu$ mode-switching flag f_j$_{(2)}$ is reset, the subroutine proceeds from step S203 to step S204. At step S204, a check is made to determine whether the temporary low-to-high-$\mu$ mode-switching flag f_j0 for the second front road wheel is set to "1". When the second temporary low-to-high-$\mu$ mode-switching flag f_j0$_{(2)}$ is reset to "0", the subroutine proceeds from step S204 to step S206. When the second temporary low-to-high-$\mu$ mode-switching flag f_j0$_{(2)}$ is set to "1", the subroutine proceeds from step S204 to step S205, so as to switch to the high-$\mu$ control.

As can be seen from the flow chart of FIG. 4, during the low-$\mu$ control (at the ABS system pressure build-up control mode), switching operation from the low-$\mu$ control to high-$\mu$ control occurs (i) when the low-to-high-$\mu$ mode-switching flag f__j$_{(1)}$ for the first front road wheel is set to "1" and the low-to-high-$\mu$ mode-switching flag f__j$_{(2)}$ for the second front road wheel is set to "1", that is, in case of f__j$_{(1)}$=1 and f__j$_{(2)}$=1, or (ii) when the low-to-high-$\mu$ mode-switching flag f__j$_{(1)}$ for the first front road wheel is set to "1" and the temporary low-to-high-$\mu$ mode-switching flag f__j0$_{(2)}$ for the second front road wheel is set to "1", that is, in case of f__j$_{(1)}$=1 and f__j0$_{(2)}$=1. On the other hand, setting of the low-to-high-$\mu$ mode-switching flag f__j to "1" occurs (a) when the number PN of pressure build-up is greater than or equal to the pulse-number threshold value N1, that is, PN≧N1, and (b) when the maximum wheel acceleration (recovery acceleration) ΔVwMAX exceeds the predetermined acceleration threshold value $\alpha_{max}$ when the wheel speed Vw of the skid-controlled road wheel is recovering to the vehicle speed (pseudo vehicle speed Vi) in the reduce-pressure operating mode continuously executed after the number PN of pressure build-up is greater than or equal to N1×70% (70% of pulse-number threshold value N1), that is, PN≧N1*0.7, and thus the temporary low-to-high-$\mu$ mode-switching flag f__j0 for the skid-controlled road wheel is set. The first low-to-high-$\mu$ mode-switching condition (a) corresponds to the flow from step S109 through steps S114, S115 and S116 to step S117 (i.e., S109→S114→S115→S116→S117). The second low-to-high-$\mu$ mode-switching condition (b) corresponds to the flow from step S116 via step S118 to step S119, and to the subsequent flow from step S116 via step S118 to step S119 (i.e., S116→S118→S119→S120→S102→S103→S104→S105→S107→S108→S109→S110→S111→S112).

The operation of the ABS system of the embodiment is hereinbelow described in detail in reference to the time chart shown in FIG. 5. The time chart of FIG. 5 shows a particular case that skid control is started during braking on low-$\mu$ road and thereafter the road surface condition is changed from low-$\mu$ road to high-$\mu$ road.

Figure 5:
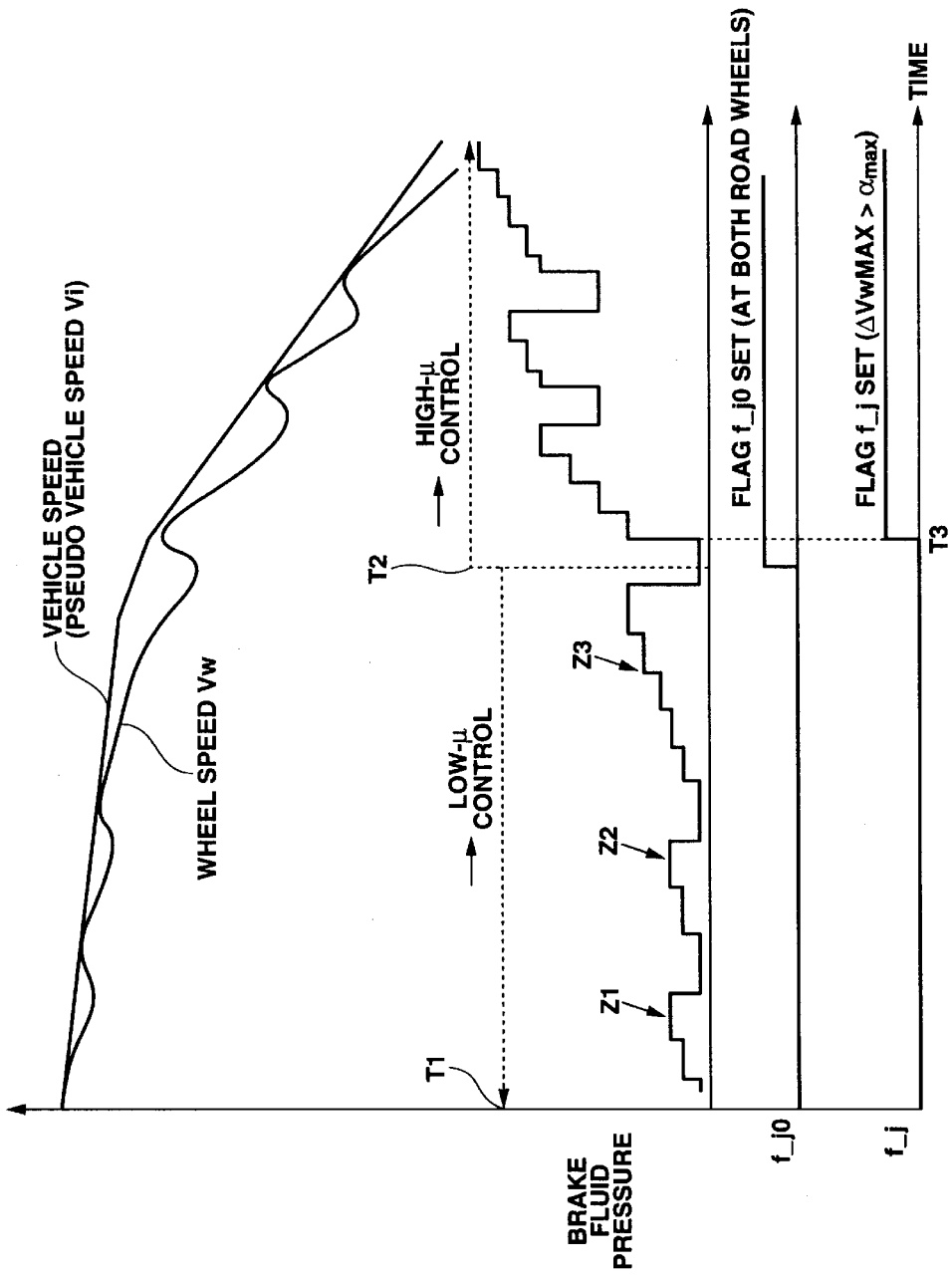
FIG. 5 is a time chart showing the operation and effect of the automotive brake control system of the embodiment.

In FIG. 5, the low-$\mu$ control is executed for the time interval from T1 to T2. Z1, Z2 and Z3 respectively denote first, second, and third brake-fluid pressure build-up controls. When the third pressure build-up control Z3 is executing, the road surface condition changes from low-$\mu$ road to high-$\mu$ road, and thus the number PN of pressure build-up increases. However, during driving, low-$\mu$ and high-$\mu$ road surfaces are generally sprinkled or dispersed, and thus the points of $\mu$ jump from low-$\mu$ to high-$\mu$ vary intermittently. In such a case, there is a decreased tendency for the number PN of pressure build-up to exceed the pulse-number threshold value N1 readily. The example of skid control of FIG. 5 shows such a case that the pressure build-up number PN does not exceed the pulse-number threshold value N1 readily. In this case, if the pressure build-up is attained so that the pressure build-up number PN exceeds the second threshold N1*0.7 (70% of pulse-number threshold value N1) when the pressure build-up number PN does not yet exceed the pulse-number threshold value N1, the temporary low-to-high-$\mu$ mode-switching flag f__j0 is set to "1" (see the flow from step S116 via step S118 to step S119 in FIG. 3). Thereafter, when the wheel speed Vw of the skid-controlled wheel becomes less than the reduce-pressure threshold value λ1 and thus the reduce-pressure mode is executed under a condition where the temporary low-to-high-$\mu$ mode-switching flag f__j0 is set, the wheel speed Vw of the skid-controlled wheel recovers near to the vehicle speed (Vi) rapidly. At this time, as soon as the maximum wheel acceleration (recovery acceleration) ΔVwMAX exceeds the predetermined acceleration threshold value $\alpha_{max}$, the processor of CU determines that there is a $\mu$ change from low-$\mu$ road to high-$\mu$ road and therefore the low-to-high-$\mu$ mode-switching flag f__j is set at once, so as to switch from low-$\mu$ control to high-$\mu$ control (see the flow from step S109 via step S110 through step S111 to step S112 in FIG. 3). Thus, after the time T3 (flag setting point of f__j=1), the pressure build-up rate tends to rise according to the high-$\mu$ control. As a consequence, it is possible to prevent the driver from experiencing undesired free-running feel, and also it is possible to reduce a braking distance as much as possible.

As will be appreciated from the above, before the pressure build-up numbers PN for left and right road wheels both exceed the pulse-number threshold value N1, the system of the embodiment shown in FIGS. 3–5 can accurately rapidly detect a road-surface $\mu$ change from low-$\mu$ to high-$\mu$ ($\mu$ jump) depending on the temporary low-to-high-$\mu$ mode-switching flag f__j0 as well as the low-to-high-$\mu$ mode-switching flag f__j, and thus optimally time the switching from low-$\mu$ control to high-$\mu$ control. Also, according to the system of the embodiment shown in FIGS. 3–5, even when the road surface conditions of left and right road wheels are different from each other and pressure build-up timings for the left and right wheels differ from each other and thus the pressure build-up numbers PN for the left and right wheels do not simultaneously exceed the threshold N1, the low-to-high-$\mu$ mode-switching flag f__j can be set to "1" under a predetermined condition defined by f__j0=1 and ΔVwMAX>$\alpha_{max}$. Therefore, the system of the embodiment can accurately detect the road-surface $\mu$ change even during vehicle driving under the road surface condition where low-$\mu$ and high-$\mu$ road surfaces are sprinkled. Additionally, according to the system of the embodiment, detection or determination of the road-surface $\mu$ change can be made to each of the left and right road wheels (see the flow shown in FIG. 4). In other words, the road-surface-condition change determination section is provided individually for the left and right road wheels. This avoids the road-surface $\mu$ change from being misjudged, thus ensuring more precise skid control.

In the system of the embodiment, immediately when a low-to-high-$\mu$ mode-switching flag f__j$_{(1)}$ for a first one of front-left and front-right road wheels is set and additionally the pressure build-up corresponding to 70% of a predetermined pulse-number threshold value N1 is attained and thus a temporary low-to-high-$\mu$ mode-switching flag f__j0$_{(2)}$ for the second front road wheel is set, switching from low-$\mu$ control to high-$\mu$ control. The second threshold is not limited to 70% of a predetermined pulse-number threshold value N1. The second threshold may be set to a predetermined value less than the first threshold value (the predetermined pulse-number threshold value N1). Moreover, in the system of the embodiment, as a recovery acceleration value of wheel speed Vw, the maximum wheel acceleration ΔVwMAX is used. The recovery acceleration value of wheel speed Vw is not limited to the maximum wheel acceleration ΔVwMAX. Instead of the use of the maximum wheel acceleration ΔVwMAX of the wheel acceleration data ΔVw calculated from the wheel speed sensor signal, a simple mean (ΔVw$_{(1)}$+ΔVw$_{(2)}$+ . . . +ΔVw$_{(n-1)}$+ΔVw$_{(n)}$)/n of a plurality of wheel acceleration data continuously calculated (ΔVw$_{(1)}$, ΔVw$_{(2)}$, . . . , ΔVw$_{(n-1)}$ and ΔVw$_{(n)}$) may be used as the recovery acceleration value. Denoted by "n" is the number of wheel acceleration data continuously calculated and stored in predetermined memory addresses of the computer memory for a predetermined time interval such as n×10 msec. Alternatively, a weighted mean $(w_1 \cdot \Delta Vw_{(1)} + w_2 \cdot \Delta Vw_{(2)} + \ldots + w_{(n-1)} \cdot \Delta V_{(n-1)} + W_{(n)} \cdot \Delta Vw_{(n)})/(w_1 + w_2 + \ldots + w_{(n-1)} + w_{(n)})$ of a plurality of wheel acceleration data continuously calculated ($\Delta Vw_{(1)}$, $\Delta Vw_{(2)}$, ..., $\Delta Vw_{(n-1)}$ and $\Delta Vw_{(n)}$) may be used as the recovery acceleration value, if each wheel acceleration data $\Delta Vwi$ is to have weight $w_i$, that is, taking into account the type of vehicle.

Japanese Patent Provisional Publication No. 3-79460 teaches the use of a so-called pressure build-up time interval from the start of pressure build-up to the end of pressure build-up. The ABS system ECU (electronic control unit) or ECM (electronic control module) as described in the Japanese Patent Provisional Publication No. 3-79460 determines that there is a lack of the rate of pressure build-up when the pressure build-up time intervals of both of front-left and front-right road wheels exceed a predetermined threshold during the low-$\mu$ control, and that the road surface condition has changed from the low-$\mu$ road to high-$\mu$ road. Thus, the system operates to regulate the hydraulic brake pressure of the wheel-brake cylinder subjected to skid control in accordance with the high-$\mu$ control instead of the low-$\mu$ control, so as to increasingly compensate for the pressure build-up rate. Assuming that the ECU or ECM erroneously determines that the road surface condition has changed from the low-$\mu$ road to high-$\mu$ road even when the vehicle is still running on the low-$\mu$ road, the wheel has an increased tendency to lock up owing to the increasingly compensated pressure build-up rate, and thus there is a possibility that the driver loses directional stability of the vehicle. To ensure more precise skid control and to avoid misjudgment, a determination of the road-surface $\mu$ change is generally based on the pressure build-up time intervals of two road wheels (left and right road wheels) but not on the pressure build-up time interval of a single road wheel. However, in case that the ECU uses the pressure build-up time intervals of the left and right road wheels in order to precisely determine the presence or absence of the road-surface $\mu$ change from low-$\mu$ to high-$\mu$ (often called "$\mu$ jump"), there is the following drawback.

For instance suppose a split-$\mu$ road where the left-hand side road-surface $\mu$ is different from the right-hand side road-surface $\mu$. In case that the low-$\mu$ road surfaces are sprinkled and additionally the sprinkled range of the left-hand side road surface is different from that of the right-hand side road surface, there is a tendency for the pressure build-up time interval for one of left and right road wheels to be kept at a time interval less than the predetermined threshold, even when the pressure build-up time interval for the other road wheel reaches the predetermined threshold. In this case, the ECU determines that there is no $\mu$ change from low-$\mu$ road to high-$\mu$ road, and therefore the low-$\mu$ control is continued. As a result the driver experiences undesired free-running feel.

Accordingly, the system of the embodiment provides an automotive brake control system with an anti-skid braking device, which avoids the aforementioned disadvantages.

Figure 6:
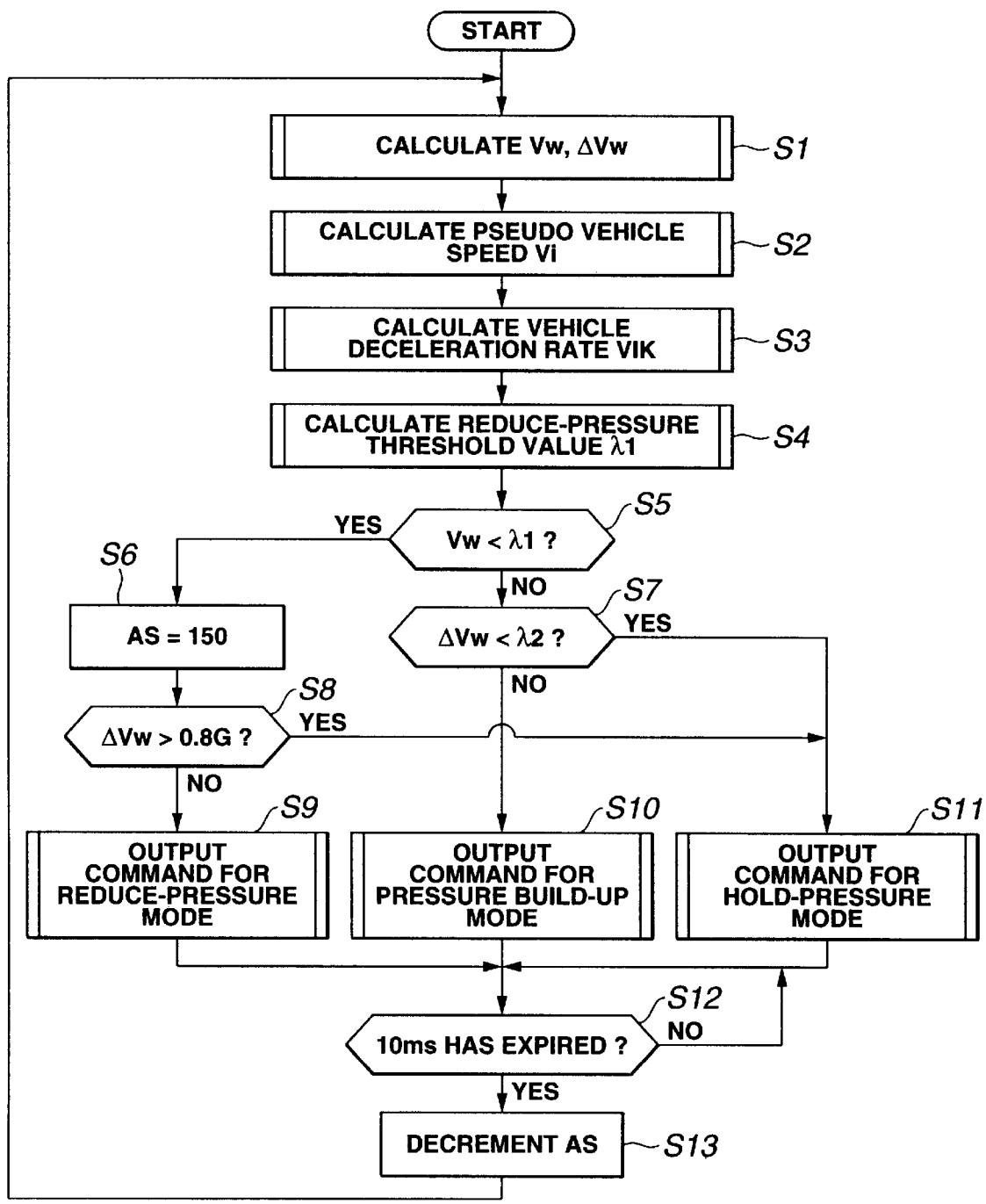
FIG. 6 is a flow chart illustrating a modified skid control routine executed by the ABS system of the embodiment.

Referring now to FIG. 6, there is shown a modified skid control routine executed by the processor of the microcomputer employed in the electronic control unit CU. The modified skid control routine shown in FIG. 6 is also executed as time-triggered interrupt routines to be triggered every predetermined time intervals such as 10 msec. Step S1 of the modified skid control routine corresponds to steps S102 and S103 shown in FIG. 3, and step S2 of the modified routine almost corresponds to step S104 of FIG. 3.

At step S1, the more recent wheel speed indicative data signals are read, and then a wheel speed Vw at each road wheel (i.e., VwFR, VwFL, and VwR) is arithmetically calculated. Then, an acceleration/deceleration rate at each road wheel (i.e., $\Delta VwFR$, $\Delta VwFL$, and $\Delta VwR$) is arithmetically calculated.

At step S2, a pseudo vehicle speed Vi is computed or determined by a predetermined or pre-programmed arithmetic processing. Detailed description of the arithmetic processing for pseudo vehicle speed Vi will be hereinafter described in detail in reference to the flow chart shown in FIG. 7.

At step S3, a vehicle deceleration rate VIK is computed or determined by a predetermined or pre-programmed arithmetic processing. Detailed description of the arithmetic processing for vehicle deceleration rate VIK will be hereinafter described in detail in reference to the flow charts shown in FIGS. 8 and 12.

At step S4, a reduce-pressure threshold value $\lambda 1$ and a hold-pressure threshold value $\lambda 2$ are computed on the basis of the pseudo vehicle speed Vi computed at step S2 of FIG. 6. For the sake of simplicity, detailed description of the arithmetic processing for reduce-pressure threshold value $\lambda 1$ will be hereinafter described in detail in reference to the flow chart shown in FIG. 9.

At step S5, a check is made to determine whether the wheel speed Vw is less than the reduce-pressure threshold value $\lambda 1$. In case of Vw<$\lambda 1$, the routine proceeds from step S5 to step S6. Conversely, in case of Vw$\geq \lambda 1$, the routine proceeds from step S5 to step S7.

At step S6, a backward timer AS is set to a predetermined value such as 150. Then, at step S8, a check is made to determine whether the wheel acceleration $\Delta Vw$ is greater than a predetermined value such as 0.8 G (where G means a gravitational acceleration unit). When the answer to step S8 is in the negative (NO), that is, in case of $\Delta Vw<0.8$ G, the CU determines that pressure reduction is required to avoid a wheel lock-up condition, and thus the routine flows to step S9. At step S9, the CU outputs command signals corresponding to the reduce-pressure operating mode to the inflow and outflow solenoid valves. Conversely, when the answer to step S8 is in the affirmative (YES), that is, in case of $\Delta Vw>0.8$ G, the CU determines that pressure reduction is not required and that the wheel speed recovers to the vehicle speed, and thus the routine flows to step S11. At step S11, the CU outputs command signals corresponding to the hold-pressure operating mode to the inflow and outflow solenoid valves. The predetermined value for the backward timer AS is set to a preset value (such as 150) enough to return the brake fluid stored in the reservoirs (7, 7) into the brake circuits 1 and 2 during the reduce-pressure operating mode of ABS system operation.

Returning to step S5, in case of Vw$\geq \lambda 1$, the routine proceeds to step S7. At step S7, a check is made to determine whether the wheel acceleration $\Delta Vw$ is less than the hold-pressure threshold value $\lambda 2$. In case of $\Delta Vw<\lambda 2$, the routine flows from step S7 to step S11, to start the hold-pressure operating mode. In case of $\Delta Vw \geq \lambda 2$, the routine flows from step S7 to step S10. At step S10, the CU outputs command signals corresponding to the pressure build-up operating mode to the inflow and outflow solenoid valves.

After steps S9, S10, or S11, the routine proceeds via step S12 to step S13. At step S12, a test is made to determine whether a predetermined time interval (10 msec) has expired from the start of the ABS system operating mode (either of the pressure-reduce mode, pressure-hold mode, and pressure build-up mode). When the predetermined time interval (10 msec) has expired, the backward timer AS is decremented.

Therefore, timer AS is not decremented until the predetermined time interval (10 msec) expires from the start of the ABS system operating mode.

Figure 7:
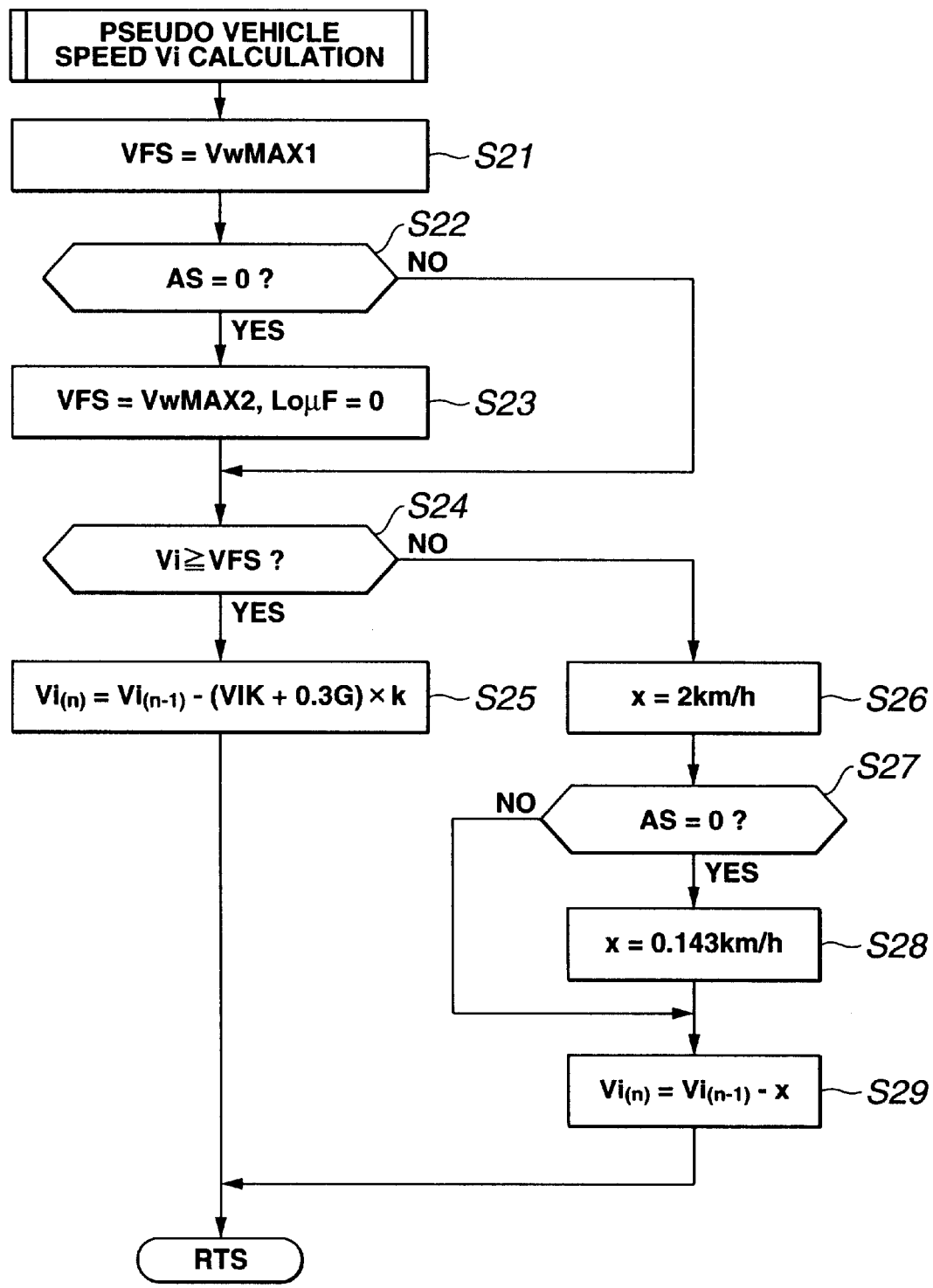
FIG. 7 is a flow chart illustrating arithmetic processing for pseudo vehicle speed Vi.

Referring now to FIG. 7, there is shown the arithmetic calculation subroutine for the pseudo vehicle speed Vi.

At step S21, a highest one (VwMAX1 or simply, VwMAX) of all of the wheel speeds Vw sensed is set as a selected wheel speed (a reference wheel speed) VFS. The selected reference wheel speed VFS, corresponding to the highest wheel speed of the wheel speed data signals is often called a "select-HIGH wheel speed" VwMAX1.

At step S22, a check is made to determine whether a skid-control-state indicative signal AS is "0". AS=0 means that the ABS system is conditioned in an inoperative state. AS≠0 means that the ABS system is in operation. In case of AS=0, the subroutine proceeds from step S22 to step S23. However, in case of AS≠0, the subroutine proceeds from step S22 to step S24.

When the ABS system is inoperative, at step S23, the reference wheel speed VFS is set to a higher one (VwMAX2) of the wheel speeds Vw of the two driven road wheels. At the same time, at step S23, a so-called low-$\mu$ flag Lo$\mu$F is reset to "0". The low-$\mu$ flag Lo$\mu$F is used to determine whether the road condition is a low-$\mu$ road surface condition. Lo$\mu$F=1 means that the road condition of the road surface on which the vehicle is now running is a low-$\mu$ road (such as snow or icy roads). Lo$\mu$F=0 means that the road condition of the road surface on which the vehicle is now running is a middle-$\mu$ road (such as wet roads) or a high-$\mu$ road (such as dry pavement). As described later in reference to the flow chart shown in FIG. 8, the low-$\mu$ flag Lo$\mu$F is set to "1", for example, when a pressure-reduction time interval DECT (described later) becomes above a predetermined time interval such as 100 msec (see steps S36 and S37 of FIG. 8).

At step S24, the selected reference wheel speed VFS, set to either the wheel speed VwMAX1 or the wheel speed VwMAX2, is compared to the pseudo vehicle speed Vi. In case of Vi≧VFS, step S25 occurs. Conversely, in case of Vi<VFS, step S26 occurs.

At step S25, the current value $Vi_{(n)}$ of pseudo vehicle speed Vi is calculated based on the previous value $Vi_{(n-1)}$ of pseudo vehicle speed Vi and the vehicle deceleration rate VIK, from the following expression.

$$Vi_{(n)} = Vi_{(n-1)} - (VIK + 0.3\ G) \times k$$

where k denotes a predetermined value, and G means a gravitational acceleration unit.

At step S26, a wheel-acceleration-period limiter value (simply, a limit value) x is set to 2 km/h. Thereafter, step S27 occurs. The limit value x is provided to prevent excessive wheel acceleration.

At step S27, in the same manner as step S22, a check is made to determine whether the skid-control-state indicative signal AS is "0". In case of AS=0, that is, when the ABS system is inoperative, the subroutine proceeds from step S27 to step S28. At step S28, the limit value x is decreasingly compensated for and thus set to 0.143 km/h less than 2 km/h. In case of AS≠0, that is, when the ABS system is operative, the subroutine proceeds from step S27 to step S29.

Thereafter, at step S29, the current value $Vi_{(n)}$ of pseudo vehicle speed Vi is calculated based on the previous value $Vi_{(n-1)}$ of pseudo vehicle speed Vi and the limit value x from the following expression.

$$Vi_{(n)} = Vi_{(n-1)} - x$$

After steps S25 or S29, the program exits the pseudo-vehicle-speed (Vi) calculation routine, and thus returns to the main routine.

Figure 8:
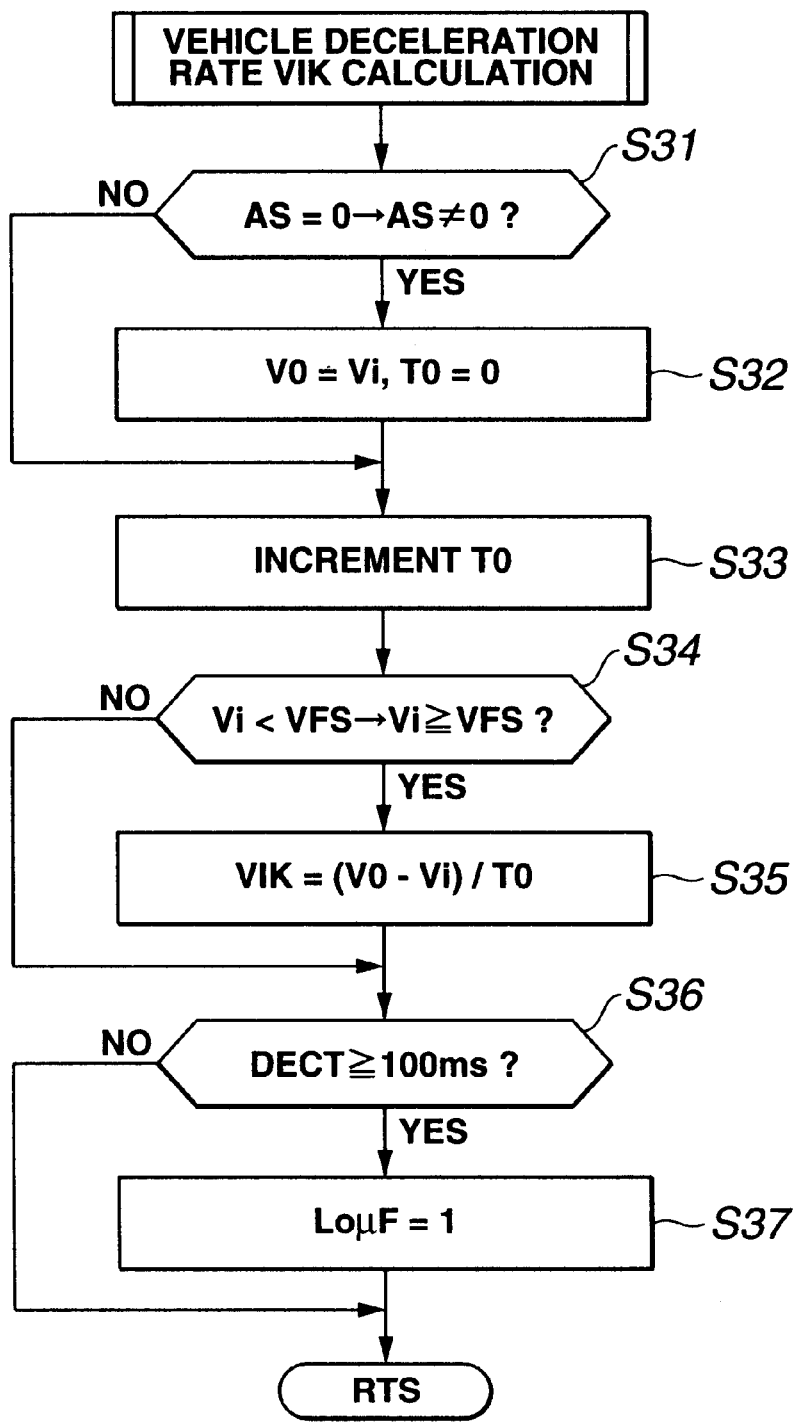
FIG. 8 is a flow chart illustrating a first arithmetic calculation for vehicle deceleration rate VIK.

Referring now to FIG. 8, there is shown a first arithmetic calculation subroutine for vehicle deceleration rate VIK.

At step S31, a check is made to determine the presence or absence of a transition from the ABS inoperative state (AS=0) to the ABS operative state (AS≠0). As soon as the ABS system comes into operation, the subroutine flows from step S31 to step S32. In the absence of the transition from the ABS inoperative state to the ABS operative state, the subroutine flows from step S31 to step S33.

Step S32, the pseudo vehicle speed Vi is set to a vehicle-deceleration starting-period vehicle speed V0. The speed value V0 corresponds to a value of pseudo vehicle speed Vi calculated at the time when the wheel speed Vw begins to decelerate after braking action. At the same time, a counted value of a timer T0 is initialized to "0".

At step S33, the timer T0 is incremented, so as to measure an elapsed time from the time when the transition indicated by AS=0→AS≠0 has occurred.

Thereafter, at step S34, a check is made to determine the presence or absence of a transition from the state defined by Vi<VFS to the state defined by Vi≧VFS. As soon as the transition indicated by Vi<VFS→Vi≧VFS occurs, the subroutine proceeds from step S34 to step S35. However, in the absence of the transition indicated by Vi<VFS→Vi≧VFS, the subroutine proceeds from step S34 to step S36.

At step S35, the vehicle deceleration rate VIK is calculated based on the vehicle-deceleration starting-period vehicle speed V0, the pseudo vehicle speed Vi, and the counted value of the timer T0, from the following expression.

$$VIK = (V0 - Vi)/T0$$

Then, at step S36, the pressure-reduction time interval DECT, during which the ABS system is in the reduce-pressure operating mode, is compared to a predetermined time interval such as 100 msec. In case of DECT≧100 msec, step S37 occurs. At step S37, the low-$\mu$ flag Lo$\mu$F is set to "1". After step S37, or in case of DECT>100 msec at step S36, the program exits the vehicle-deceleration-rate (VIK) calculation routine, and thus returns to the main routine.

Figure 9:
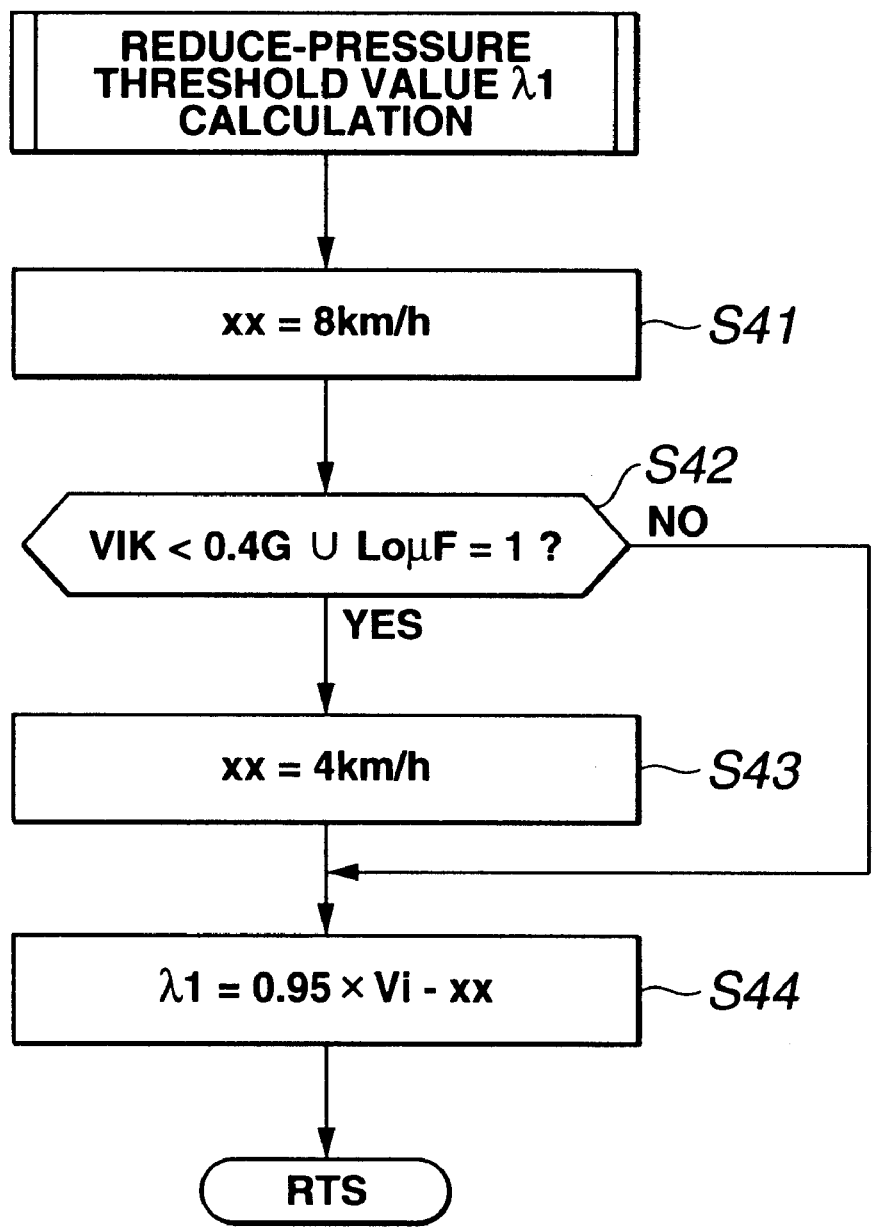
FIG. 9 is a flow chart illustrating arithmetic processing for reduce-pressure threshold value $\lambda 1$.

Referring now to FIG. 9, there is shown the reduce-pressure threshold value $\lambda 1$ arithmetic-calculation subroutine.

At step S41, an offset value xx is set to 8 km/h. As can be appreciated from the following step S42, the offset value xx varies depending on the vehicle deceleration rate VIK and the low-$\mu$ flag Lo$\mu$F.

At step S42, a check is made to determine whether a union defined by VIK<0.4 G ∪ Lo$\mu$F=1 is satisfied. When the union defined by logical expression VIK<0.4 G ∪ Lo$\mu$F=1 is satisfied, that is, in case of VIK<0.4 G and/or Lo$\mu$1, the subroutine proceeds from step S42 to step S43. At step S43, the offset value xx is decreasingly compensated for and thus set to 4 km/h. Conversely, when the union defined by VIK<0.4 G ∪ Lo$\mu$F=1 is unsatisfied, that is, in case of VIK≧0.4 G and Lo$\mu$F=0, the subroutine proceeds from step S42 to step S44.

At step S44, the reduce-pressure threshold value $\lambda 1$ is computed based on the pseudo vehicle speed Vi and the offset value xx, from the following expression.

$$\lambda 1 = 0.95 \times Vi - xx$$

According to the routine of FIG. 9, the reduce-pressure threshold value $\lambda 1$ is properly determined depending upon the road surface condition, that is, depending upon whether the low-$\mu$ flag Lo$\mu$F is set (low-$\mu$ road) or reset (middle-$\mu$ road or high-$\mu$ road), and upon the result of comparison between the vehicle deceleration rate VIK and the predetermined value such as 0.4 G (where G means a gravitational acceleration unit). Thereafter, the program exits the reduce-pressure threshold value ($\lambda$1) calculation routine, and thus returns to the main routine.

Figure 10:
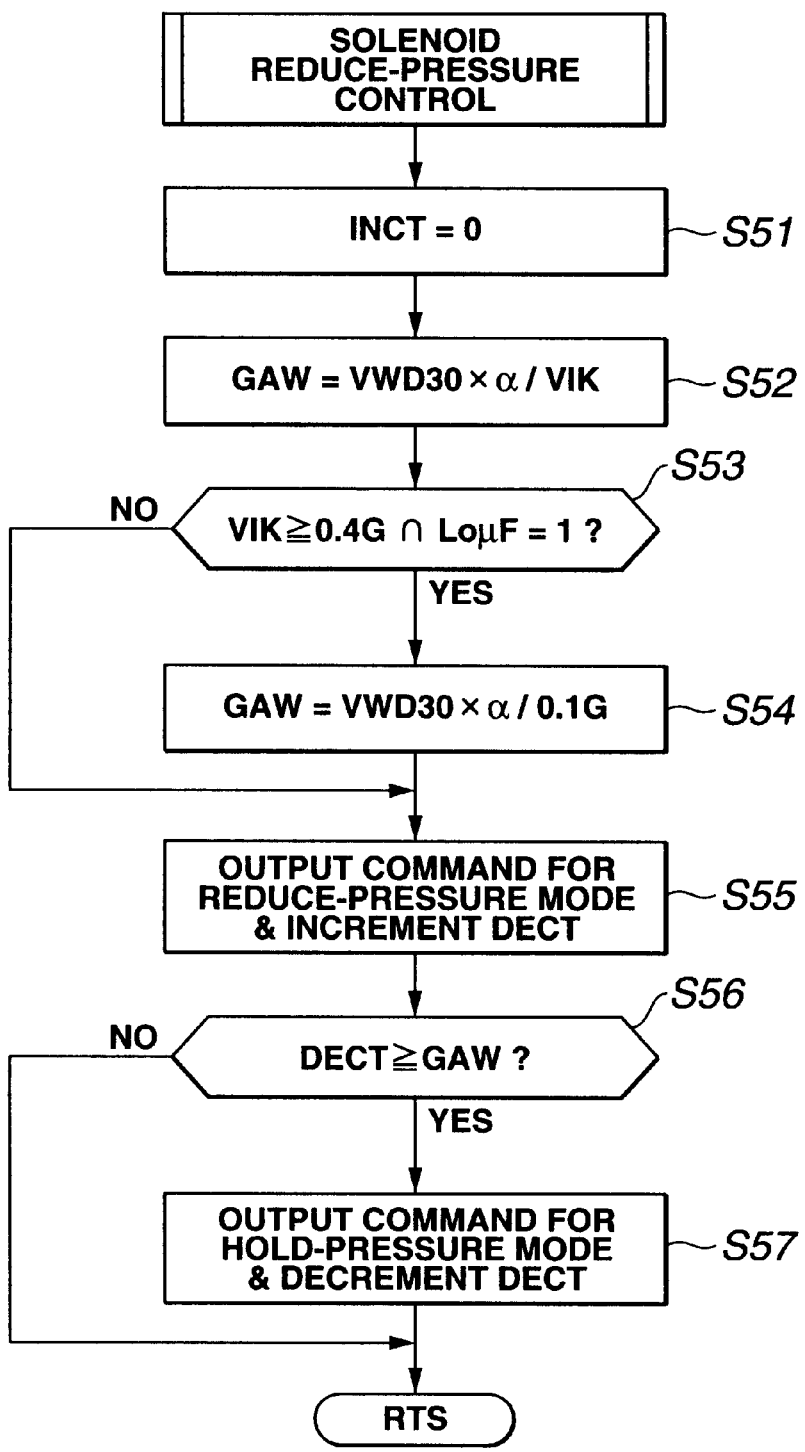
FIG. 10 is a flow chart illustrating a subroutine for solenoid reduce-pressure control.

Referring now to FIG. 10, there is shown the solenoid reduce-pressure control subroutine for the inflow and outflow solenoid valves (5, 6).

At step S51, a pressure build-up time interval INCT is initialized to "0".

At step S52, a target pressure-reduction time interval GAW is calculated based on a rate-of-change VWD30 of wheel speed Vw per 30 msec, and the vehicle deceleration rate VIK, from the following expression.

$$GAW = VWD30 + \alpha/VIK$$

where $\alpha$ is a predetermined fixed value.

Thereafter, at step S53, a check is made to determine whether an intersection defined by VIK$\geq$0.4 G $\cap$ Lo$\mu$F=1 is satisfied. When the intersection defined by VIK$\geq$0.4 G $\cap$ Lo$\mu$F=1 is satisfied, that is, in case of VIK$\geq$0.4 G and Lo$\mu$F=1, the subroutine proceeds to step S54. Conversely, when the intersection defined by VIK$\geq$0.4 G $\cap$ Lo$\mu$F=1 is unsatisfied, that is, in case of VIK<0.4 G or Lo$\mu$F=0, the subroutine proceeds to step S55.

At step S54, the target pressure-reduction time interval GAW is calculated based on only the rate-of-change VWD30 of wheel speed Vw per 30 msec, from the following expression.

$$GAW = VWD30 \times \alpha/0.1\ G$$

The use of the aforementioned rate-of-change VWD30 of wheel speed Vw per 30 msec is superior to the use of a rate-of-change VWD10 of wheel speed Vw per 10 msec, a rate-of-change VWD20 of wheel speed Vw per 20 msec, or a rate-of-change VWD40 of wheel speed Vw per 40 msec, from the viewpoint of the responsiveness and noise reduction of skid control. In more detail, the rate-of-change VWD10 of wheel speed Vw per 10 msec and the rate-of-change VWD20 of wheel speed Vw per 20 msec are inferior to the rate-of-change VWD30 of wheel speed Vw per 30 msec from the viewpoint of noise reduction. On the other hand, the rate-of-change VWD40 of wheel speed Vw per 40 msec is inferior to the rate-of-change VWD30 of wheel speed Vw per 30 msec from the viewpoint of the responsiveness. For the reasons discussed above, in the modified system shown in FIGS. 6 through 12, the rate-of-change VWD30 of wheel speed Vw per 30 msec is used for the solenoid pressure-reduction control subroutine of FIG. 10, the solenoid pressure-build-up control subroutine of FIG. 11 (described later), and the vehicle-deceleration rate (VIK) calculation subroutine of FIG. 12 (described later).

At step S55, the CU outputs command signals corresponding to the reduce-pressure operating mode to the inflow and outflow solenoid valves, and simultaneously the pressure-reduction time interval DECT is incremented.

At step S56, the pressure-reduction time interval DECT is compared to the target pressure-reduction time interval GAW. In case of DECT$\geq$GAW, step S57 occurs. At step S57, the CU outputs command signals corresponding to the hold-pressure operating mode to the inflow and outflow solenoid valves, and simultaneously the pressure-reduction time interval DECT is decremented. The previously-discussed intersection defined by the logical expression VIK$\geq$0.4 G $\cap$ Lo$\mu$F=1 (see step S53) means that the CU has determined that the current road surface condition is a low road (Lo$\mu$F=1) before the wheel speed Vw reaches a spin-up speed VP. The spin-up speed corresponds to a value VP of pseudo vehicle speed Vi calculated at the time when the pseudo vehicle speed changes from an increasing state to a decreasing state at each execution cycle of skid control. At the initial cycle of skid control, the vehicle deceleration rate VIK is set to an initial value such as a deceleration rate ranging from 0.6 G to 1.4 G, and therefore the initial value of vehicle deceleration rate VIK is greater than 0.4 G at the initial stage of skid control. Thus, under such a condition, the intersection defined by the logical expression VIK$\geq$0.4 G $\cap$ Lo$\mu$F=1 is satisfied. In this case, the target pressure-reduction time interval GAW can be set to a pressure-reduction rate (or a pressure-reduction time interval) defined by the expression GAW=VWD30$\times\alpha$/0.1 G and programmed to be suitable for the low-$\mu$ road surface condition (see the flow from step S53 to step S54). Otherwise, the target pressure-reduction time interval GAW can be set to a pressure-reduction rate (or a pressure-reduction time interval) defined by the expression GAW=VWD30$\times\alpha$/VIK and programmed to be suitable for road surface conditions except for the low-$\mu$ road surface condition. After step S57, or in case of DECT<GAW at step S56, the program exits the solenoid pressure-reduction control routine, and thus returns to the main routine.

Figure 11:
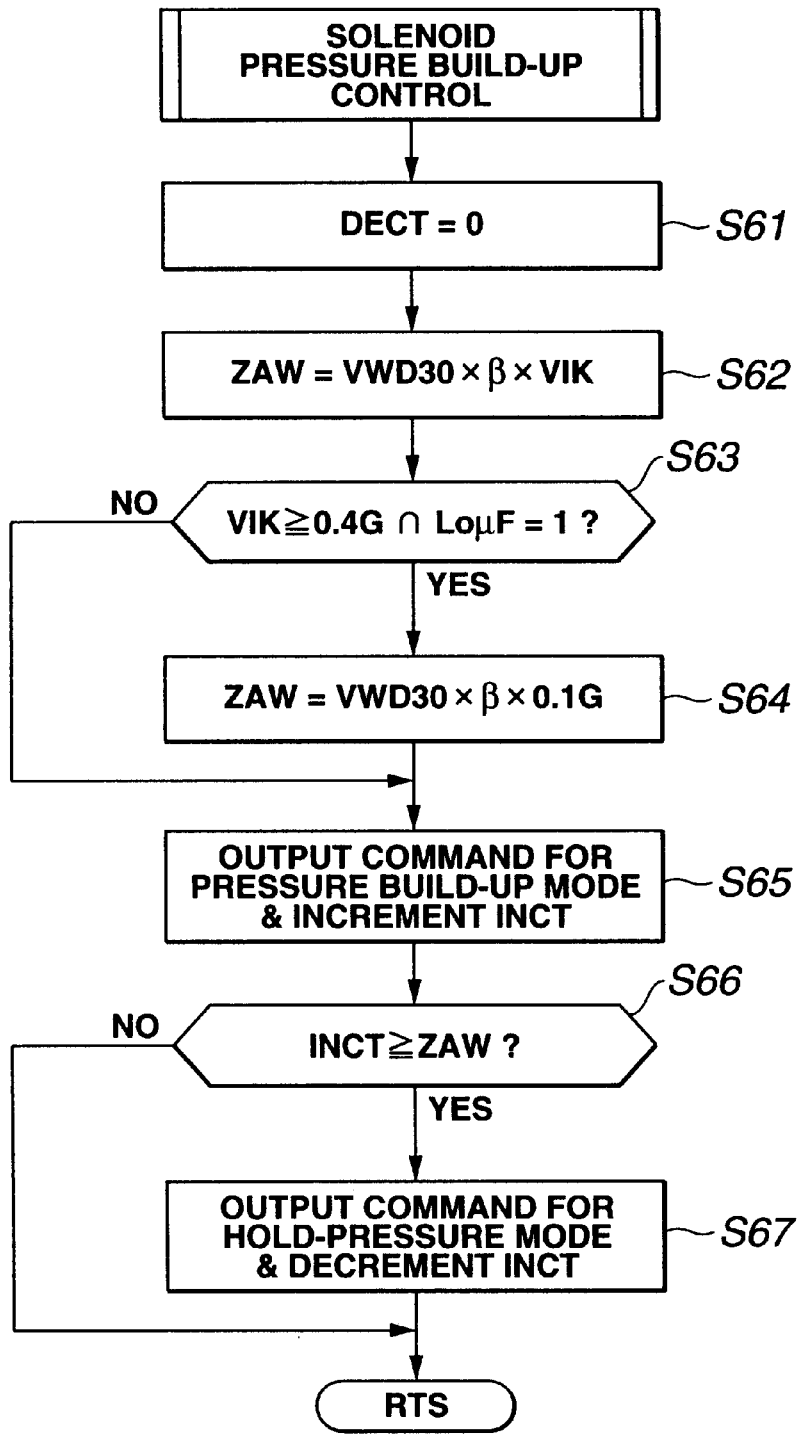
FIG. 11 is a flow chart illustrating a subroutine for solenoid pressure build-up control.

Referring now to FIG. 11, there is shown the solenoid pressure-build-up control subroutine for the inflow and outflow solenoid valves (5, 6).

At step S61, a pressure-reduction time interval DECT is initialized to "0".

At step S62, a target pressure-build-up time interval ZAW is calculated based on the rate-of-change VWD30 of wheel speed Vw per 30 msec, and the vehicle deceleration rate VIK, from the following expression.

$$ZAW = VWD30 \times \beta \times VIK$$

where $\beta$ is a predetermined fixed value. The above-mentioned values $\alpha$ and $\beta$ are tuned values pre-programmed or predetermined to be provide optimal skid control.

Thereafter, at step S63, a check is made to determine whether an intersection defined by VIK$\geq$0.4 G $\cap$ Lo$\mu$F=1 is satisfied. When the intersection defined by VIK$\geq$0.4 G $\cap$ Lo$\mu$F=1 is satisfied, that is, in case of VIK$\geq$0.4 G and Lo$\mu$F=1, the subroutine proceeds to step S64. Conversely, when the intersection defined by VIK$\geq$0.4 G $\cap$ Lo$\mu$F=1 is unsatisfied, that is, in case of VIK<0.4 G or Lo$\mu$F=0, the subroutine proceeds to step S65.

At step S64, the target pressure-build-up time interval ZAW is calculated based on only the rate-of-change VWD30 of wheel speed Vw per 30 msec, from the following expression.

$$ZAW = VWD30 \times \beta \times 0.1\ G$$

At step S65, the CU outputs command signals corresponding to the pressure build-up operating mode to the inflow and outflow solenoid valves, and simultaneously the pressure-build-up time interval INCT is incremented.

At step S66, the pressure-build-up time interval INCT is compared to the target pressure-build-up time interval ZAW. In case of INCT$\geq$ZAW, step S67 occurs. At step S67, the CU outputs command signals corresponding to the hold-pressure operating mode to the inflow and outflow solenoid valves, and simultaneously the pressure-build-up time interval INCT is decremented. The previously-discussed intersection defined by the logical expression VIK≧0.4 G ∩ LoµF=1 (see step S63) means that the CU has determined that the current road surface condition is a low road (LoµF=1) before the wheel speed Vw reaches the spin-up speed VP. At the initial stage of skid control, the intersection defined by the logical expression VIK≧0.4 G ∩ LoµF=1 is satisfied. In this case, the target pressure-build-up time interval ZAW can be set to a pressure-build-up rate (or a pressure-build-up time interval) defined by the expression ZAW=VWD30=β+0.1 G and programmed to be suitable for the low-µ road surface condition (see the flow from step S63 to step S64). Otherwise, the target pressure-build-up time interval ZAW can be set to a pressure-build-up rate (or a pressure-build-up time interval) defined by the expression ZAW=VWD30×β=VIK and programmed to be suitable for road surface conditions except for the low-µ road surface condition. After step S67, or in case of INCT<ZAW at step S66, the program exits the solenoid pressure-build-up control routine, and thus returns to the main routine.

Referring now to FIG. 12, there is shown a second arithmetic calculation subroutine for vehicle deceleration rate VIK. As discussed later, the vehicle deceleration rate VIK calculation subroutine of FIG. 12 is superior to that of FIG. 8, from the viewpoint of more precise determination of the road surface condition. Steps S71, S72, S74, S75, S86 and S87 of the second vehicle deceleration rate VIK calculation subroutine of FIG. 12 correspond to steps S31, S32, S34, S35, S36 and S37 shown in FIG. 8, and step S73 of FIG. 12 is somewhat similar to step S33 of FIG. 8. Thus, the other steps S76–S85, and S88–S92 will be hereinafter described in detail with reference to the accompanying drawings, while detailed description of steps S71–S75 and S86–S87 will be omitted because the above description thereon seems to be self-explanatory.

In the presence of the transition from the ABS inoperative state (AS=0) to the ABS operative state (AS≠0), the subroutine proceeds from step S71 to step S72. During the ABS inoperative state, the subroutine flows from step S71 to step S73.

At step S72, the pseudo vehicle speed Vi is set to the vehicle-deceleration starting-period vehicle speed V0, and at the same time a counted value of timer T0 is initialized to "0".

At step S73, the timer T0 is incremented, so as to measure an elapsed time from the time when the transition indicated by AS=0→AS≠0 has occurred. At the same time, a spin-up time (or a derivative time) VPT is incremented. The spin-up time VPT corresponds to a time interval from a first spin-up point (see the point corresponding to the first spin-up speed VPA in FIGS. 14A–14D) to a second spin-up point (see the point corresponding to the second spin-up speed VPB in FIGS. 14A–14D).

At step S74, the presence or absence of a transition from the state defined by Vi<VFS to the state defined by Vi≧VFS is checked. In other words, a check is made to determine whether the wheel speed Vw reaches the spin-up speed point (VP). If the transition indicated by Vi<VFS→Vi≧VFS occurs, the subroutine proceeds from step S74 to step S75. However, in the absence of the transition indicated by Vi<VFS→Vi≧VFS, the subroutine proceeds from step S74 to step S78.

At step S75, the vehicle deceleration rate VIK is calculated from the expression VIK=(V0−Vi)/T0.

At step S76, the first spin-up speed VPA (i.e., the previous value $VP_{(n-1)}$ of spin-up speed VP) is updated by the second spin-up speed VPB (i.e., the current value $VP_{(n)}$ of spin-up speed VP), the second spin-up speed VPB is updated by the pseudo vehicle speed indicative data Vi, and thereafter a time rate of change of spin-up speed VP, that is, a derivative VIKB (=dVP/dt) of spin-up speed VP is calculated from the following expression.

$$VIKB=(VPA-VPB)/VPT$$

At step S77, the spin-up time VPT is set to "0", the slip time LoµT is initialized to "0", a middle-µ/high-µ flag HµF (simply, a high-µ flag HµF) is reset to "0", and a wheel lock-up indicative flag LOCKF (simply, a wheel-lock-up flag LOCKF) is reset to "0".

At step S78, a check is made to determine whether a condition defined by LoµT≠0 or Vw<λ1 is satisfied. When the wheel speed Vw becomes less than the reduce-pressure threshold value λ1 and thus the CU begins to measure the slip time LoµT, the answer to step S78 is affirmative (YES). At this time, the subroutine proceeds to step S79. Conversely, when LoµT=0 and Vw≧λ1, the routine flows from step S78 to step S80.

At step S79, the slip time LoµT is incremented.

At step S80, in order to determine whether the road wheel is locked up, the wheel speed Vw is compared to a predetermined speed value such as 0 km/h. If at least one of the wheels is locked up and the condition Vw=0 km/h is satisfied, step S81 occurs. When Vw≠0 km/h, step S82 occurs.

At step S81, the wheel-lock-up flag LOCKF is set to "1".

At step S82, a check is made to determine whether the transition from the wheel locked-up state defined by LOCKF=1 to the wheel unlocked state defined by LOCKF=0. As soon as the transition indicated by LOCKF=1→0 occurs, the routine proceeds to step S83. However, in the absence of the transition indicated by LOCKF=1→0, the routine advances from step S82 to step S86.

At step S83, the time rate of change VIKB of spin-up speed VP is compared to a predetermined acceleration value. The predetermined acceleration value is set to a value ranging from 0.3 G to 0.6 G (more preferably 0.5 G) In the system of the embodiment, the predetermined acceleration value is set to 0.5 G. When VIKB<0.5 G and thus the CU determines that there is an increased tendency for the road wheel to be locked up, the routine proceeds from step S83 to step S84. At step S84, low-µ flag LoµF is set to "1". Conversely when VIKB≧0.5 G, the routine proceeds from step S83 to step S85. At step S85, low-µ flag LoµF is cleared to "0".

At step S86, the pressure-reduction time interval DECT is compared to a predetermined time interval such as 100 msec. In case of DECT≧100 msec, step S87 occurs. At step S87, low-µ flag LoµF is set to "1". In case of DECT<100 msec at step S86, the routine proceeds to step S88. Note that, in the second vehicle deceleration rate (VIK) calculation routine of FIG. 12, setting or resetting of low-µ flag LoµF is dependent upon the time rate of change VIKB of spin-up speed VP as well as the pressure-reduction time interval DECT.

Thereafter, at step S88, the acceleration threshold value (recovery acceleration threshold) $\alpha_{max}$ is computed or map-retrieved from a predetermined or preprogrammed $\alpha_{max}$ versus LoµT characteristic map showing how the recovery acceleration threshold value $\alpha_{max}$ varies relative to the slip time LoµT. As can be seen from the preprogrammed $\alpha_{max}$ versus LoµT characteristic map shown in FIG. 13, the recovery acceleration threshold) $\alpha_{max}$ varies in the order of the low-µ road, middle-µ road, and high-µ road. The recovery acceleration threshold value $\alpha_{max}$ (related to the wheel recovery acceleration such as ΔVwMAX or the simple-mean wheel recovery acceleration or the weighted-mean wheel recovery acceleration) of the middle-μ road tends to be less than that of the high-μ road and to be greater than that of the low-μ road. For example, as compared to the low-μ road, during driving on the middle-μ road the wheel recovery acceleration tends to be greater and also the slip time LoμT tends to be shorter. So, in the system of the embodiment of FIG. 12, the wheel recovery acceleration threshold value $\alpha_{max}$ is variably determined depending on the road surface condition (road-surface μ) and slip time LoμT. In other words, the road surface condition can be represented as a function of the wheel recovery acceleration (ΔVwMAX) and slip time (LoμT). In the shown embodiment, the road-surface-condition decision value DDM, which is obtained by dividing the maximum wheel acceleration (recovery acceleration) ΔVwMAX by the recovery time LoμT measured, can be used to determine the road surface condition (see step S206 of FIG. 4).

Then, at step S89, in order to judge the road surface condition from the result of comparison of the wheel recovery acceleration (the rate-of-change VWD30 of wheel speed Vw per 30 msec) with the acceleration threshold value $\alpha_{max}$, a check is made to determine whether the rate-of-change VWD30 of wheel speed Vw per 30 msec is greater than the acceleration threshold value $\alpha_{max}$. When VWD30>$\alpha_{max}$ step S90 occurs. At step S90, high-μ flag HμF is set to "1". On the other hand, when the answer to step S89 is negative (NO), that is, VWD30≦$\alpha_{max}$ the routine proceeds from step S89 to step S91.

At step S91, a test is made to determine when the high-μ flag HμF is set. In case of HμF=1, the routine flows from step S91 to step S92. At step S92, low-μ flag LoμF is reset to "0". In contrast, in case of HμF=0, the program exits the second vehicle deceleration rate VIK calculation routine of FIG. 12, and thus returns to the main routine.

As discussed above, in the first vehicle-deceleration-rate VIK calculation subroutine of FIG. 8, low-μ flag LoμF, indicative of the road surface condition, is set by the pressure-reduction time interval DECT greater than or equal to the predetermined time interval (100 msec) (see step S36 of FIG. 8). On the other hand, in the second vehicle-deceleration-rate VIK calculation subroutine of FIG. 12, low-μ flag LoμF, indicative of the road surface condition, is temporarily set by the pressure-reduction time interval DECT greater than or equal to the predetermined time interval (100 msec) (see step S86 of FIG. 12), and thereafter when the wheel-lock-up flag LOCKF is set by the predetermined condition of Vw=0 km/h (see the flow from step S80 to step S81), low-μ flag LoμF, temporarily set at step S87, can be cleared to "0" under the predetermined condition of VIKB>0.5 G (see the flow from step S82 via step S83 to step S85) or remain set to "1" under the predetermined condition of VIKB<0.5 G (see the flow from step S82 via step S83 to step S84). That is, according to the second vehicle-deceleration-rate VIK calculation subroutine of FIG. 12, by the use of the time rate of change VIKB of spin-up speed Vp, the μ-change from low-μ road to high-μ road, is rapidly detected. Therefore, the accuracy of determination for the road surface condition (road-surface μ) of the vehicle-deceleration-rate VIK calculation subroutine of FIG. 12 is higher than that of FIG. 8.

FIGS. 14A through 14D show simulation test results obtained by the ABS system of the embodiment capable of performing the routine shown in FIG. 12, during driving on low-μ road, whereas FIGS. 15A through 15D show simulation test results obtained during driving on middle-μ road. As shown in FIGS. 14A–14D, during the vehicle driving on low-μ road, the slip time LoμT and the spin-up time VpT tend to be longer and thus the time rate of change VIKB (=(VPA−VPB)/VPT) of spin-up speed Vp is relatively small. Therefore, in step S83 of the routine shown in FIG. 12, the condition of VIKB<0.5 G is satisfied (YES) and thus the routine flows from step S83 to step S84, to retain low-μ flag LoμF set (LoμF=1), and the road surface condition is decided continually as low-μ road. On the other hand, as shown in FIGS. 15A–15D, during the vehicle driving on middle-μ road, the slip time LoμT and the spin-up time VpT tend to be shorter and thus the time rate of change VIKB (=(VPA−VPB)/VPT) of spin-up speed Vp is relatively great. Therefore, in step S83 of the routine shown in FIG. 12, the condition of VIKB<0.5 G is unsatisfied (NO) and thus the routine proceeds from step S83 to step S85, to clear low-μ flag LoμF, and the ECU determines the road surface condition is changed from low-μ road to middle-μ road (or high-μ road).

As described previously, according to the ABS system related to FIGS. 3 and 4, in order to prevent erroneous detection of the road-surface μ when at least one of the road wheels is locking up, a determination for μ change (μ jump) from low-μ road to high-μ road is based on the temporary low-to-high-μ mode-switching flag f_j0 as well as the low-to-high-μ mode-switching flag f_j, thus ensuring high-accuracy μ change (μ jump) decision. On the other hand, according to the ABS system related to FIGS. 6 through 12, in order to accurately determine the road-surface μ when at least one of the road wheels is locking up (LOCKF=1), the road-surface-condition change determination section of the ABS system inhibits the μ change (μ jump) from being determined based on both the time length (PN or DECT or DDM) of brake-fluid-pressure control and the recovery acceleration (ΔVwMAX or VWD30) of the wheel speed, and then the determination for μ change (μ jump) is corrected based on the time rate of change in spin-up speed Vp, that is, the derivative dVp/dt (=(VPA−VPB)/VPT=VIKB).

The entire contents of Japanese Patent Application No. P2000-073733 (filed Mar. 16, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive brake control system comprising:
vehicle sensors which detect at least each wheel speed of road wheels to generate wheel speed sensor signals;
an anti-brake skid unit which controls a wheel-brake cylinder pressure to each individual wheel cylinder of the road wheels to prevent a wheel lock-up condition during braking;
a control unit being configured to be connected electrically to the vehicle sensors and the anti-brake skid unit to execute skid control having at least a reduce-pressure operating mode and a pressure build-up operating mode, when the wheel speed sensor signals indicate that at least one of the road wheels is locking up: said control unit comprising
a road-surface-condition change determination section which determines, based on both a time length of brake-fluid-pressure control continuously executed during the skid control and a recovery acceleration of the wheel speed of the road wheel subjected to the skid control, whether there is a change of a road surface condition from a road surface having a low friction coefficient to a road surface having a high friction coefficient.

2. The automotive brake control system as claimed in claim 1, wherein the recovery acceleration is a wheel acceleration that the wheel speed of the road wheel, subjected to the skid control, increases toward and recovers to a vehicle speed during the reduce-pressure operating mode of the skid control.

3. The automotive brake control system as claimed in claim 2, wherein the road-surface-condition change determination section determines that there is the change of the road surface condition from the road surface having the low friction coefficient to the road surface having the high friction coefficient when a value of the recovery acceleration of the wheel speed exceeds a specified acceleration threshold value.

4. The automotive brake control system as claimed in claim 3, wherein the specified acceleration threshold value is set to an acceleration value ranging from 3 G to 4 G, where G is a gravitational acceleration unit.

5. The automotive brake control system as claimed in claim 3, wherein the road-surface-condition change determination section determines that there is the change of the road surface condition from the road surface having the low friction coefficient to the road surface having the high friction coefficient, when a mean value of the recovery acceleration of the wheel speed exceeds the specified acceleration threshold value.

6. The automotive brake control system as claimed in claim 3, wherein the time length of brake-fluid-pressure control is a time interval of pressure build-up executed during the pressure build-up operating mode of the skid control.

7. The automotive brake control system as claimed in claim 6, wherein the anti-brake skid unit comprises pressure build-up and reduce-pressure solenoid valves to control the wheel-brake cylinder pressure to each of the wheel cylinders of the road wheels, and the time interval of pressure build-up corresponds to a number of pulses of a pulse signal applied to the pressure build-up solenoid valve, and the road-surface-condition change determination section determines that there is the change of the road surface condition from the road surface having the low friction coefficient to the road surface having the high friction coefficient, when the number of pulses of the pulse signal exceeds a predetermined pulse number.

8. The automotive brake control system as claimed in claim 3, wherein the specified acceleration threshold value is set as a variable value based on a slip time interval from a time when the wheel speed is reduced to below a reduce-pressure threshold value below which the reduce-pressure operating mode of the skid control is started to a time when the wheel speed recovers near to the vehicle speed by way of the reduce-pressure operating mode.

9. The automotive brake control system as claimed in claim 8, wherein the time length of brake-fluid-pressure control is a time interval of pressure reduction executed during the reduce-pressure operating mode of the skid control, and the road-surface-condition change determination section determines that there is the change of the road surface condition from the road surface having the low friction coefficient to the road surface having the high friction coefficient, when the time interval of pressure reduction exceeds a predetermined time interval.

10. The automotive brake control system as claimed in claim 3, wherein the road-surface-condition change determination section inhibits the change of the road surface condition from the road surface having the low friction coefficient to the road surface having the high friction coefficient from being determined based on both the time length of brake-fluid-pressure control and the recovery acceleration of the wheel speed, when the road wheel is locking up.

11. The automotive brake control system as claimed in claim 10, wherein the control unit comprises:
(1) a vehicle speed calculation section which calculates the vehicle speed based on the wheel speed sensor signals; and
(2) a reduce-pressure threshold value calculation section which calculates, based on the vehicle speed, a reduce-pressure threshold value below which the reduce-pressure operating mode of the skid control is started; and
wherein the road-surface-condition change determination section is programmed to perform the following,
deriving, at each execution cycle of the brake-fluid-pressure control, a spin-up speed that corresponds to a value of the vehicle speed calculated at the time when the wheel speed recovers near to the vehicle speed by way of the reduce-pressure operating mode after the wheel speed has been reduced to below the reduce-pressure threshold value;
calculating a time rate of change of the spin-up speed; and
determining, based on the time rate of change of the spin-up speed, whether there is the change of the road surface condition from the road surface having the low friction coefficient to the road surface having the high friction coefficient.

12. The automotive brake control system as claimed in claim 11, wherein the road-surface-condition change determination section determines that there is the change of the road surface condition from the road surface having the low friction coefficient to the road surface having the high friction coefficient, when the time rate of change of the spin-up speed exceeds a predetermined acceleration value ranging from 0.3 G to 0.6 G, where G is a gravitational acceleration unit.

13. An automotive brake control system comprising:
vehicle sensors for detecting at least each wheel speed of road wheels to generate wheel speed sensor signals;
an anti-brake skid unit for controlling a wheel-brake cylinder pressure to each individual wheel cylinder of the road wheels to prevent a wheel lock-up condition during braking;
a control unit being configured to be connected electrically to the vehicle sensors and the anti-brake skid unit to execute skid control having at least a reduce-pressure operating mode and a pressure build-up operating mode, when the wheel speed sensor signals indicate that at least one of the road wheels is locking up: said control unit comprising
a road-surface-condition change determination means for determining, based on both a time length of brake-fluid-pressure control continuously executed during the skid control and a recovery acceleration of the wheel speed of the road wheel subjected to the skid control, whether there is a change of a road surface condition from a road surface having a low friction coefficient to a road surface having a high friction coefficient.

14. An automotive brake control system comprising:

vehicle sensors which detect at least each wheel speed of road wheels to generate wheel speed sensor signals;

an anti-brake skid unit which controls a wheel-brake cylinder pressure to each individual wheel cylinder of the road wheels to prevent a wheel lock-up condition during braking;

a control unit being configured to be connected electrically to the vehicle sensors and the anti-brake skid unit to execute skid control having at least a reduce-pressure operating mode and a pressure build-up operating mode, when the wheel speed sensor signals indicate that at least one of the road wheels is locking up: said control unit comprising a road-surface-condition change determination section which determines, based on both a time length of brake-fluid-pressure control continuously executed during the skid control and a recovery acceleration of the wheel speed of the road wheel subjected to the skid control, whether there is a change of a road surface condition from a road surface having a low friction coefficient to a road surface having a high friction coefficient, the road-surface-condition change determination section being provided individually for at least left and right wheels of the road wheels.

15. The automotive brake control system as claimed in claim 14, wherein the road-surface-condition change determination section determines that there is the change of the road surface condition from the road surface having the low friction coefficient to the road surface having the high friction coefficient, when either one of the following two criteria for determining is satisfied:

(i) a first criterion that a time length of brake-fluid-pressure control continuously executed during the skid control is greater than or equal to a first predetermined threshold value; and (ii) a second criterion that the time length of brake-fluid-pressure control is greater than or equal to a second predetermined threshold value, based on and set to be less than the first predetermined threshold value, and that the recovery acceleration of the wheel speed exceeds a predetermined acceleration threshold value.

16. The automotive brake control system as claimed in claim 15, wherein the road-surface-condition change determination section finally determines that there is the change of the road surface condition from the road surface having the low friction coefficient to the road surface having the high friction coefficient, when the road-surface-condition change determination section associated with a first one of the left and right wheels determines that there is the change of the road surface condition and the road-surface-condition change determination section associated with the second wheel determines that there is the change of the road surface condition.

17. The automotive brake control system as claimed in claim 16, wherein the road-surface-condition change determination section comprises a temporary road-surface-condition change determination section which determines temporarily that there is the change of a road surface condition from the road surface having the low friction coefficient to the road surface having the high friction coefficient when the time length of brake-fluid-pressure control is greater than or equal to a second predetermined threshold value, and the road-surface-condition change determination section finally determines that there is the change of the road surface condition from the road surface having the low friction coefficient to the road surface having the high friction coefficient, when the road-surface-condition change determination section associated with the first wheel determines that there is the change of the road surface condition and the temporary road-surface-condition change determination section associated with the second wheel determines temporarily that there is the change of the road surface condition.

18. The automotive brake control system as claimed in claim 17, wherein the time length of brake-fluid-pressure control is a time interval of pressure build-up executed during the pressure build-up operating mode of the skid control.

19. The automotive brake control system as claimed in claim 17, wherein the time length of brake-fluid-pressure control is a time interval of pressure reduction executed during the reduce-pressure operating mode of the skid control.

20. The automotive brake control system as claimed in claim 15, wherein the recovery acceleration of the wheel speed of the road wheel subjected to the skid control is a mean value of a plurality of wheel acceleration data continuously calculated for a predetermined time interval.

21. The automotive brake control system as claimed in claim 15, wherein the recovery acceleration of the wheel speed of the road wheel subjected to the skid control is a maximum value of a plurality of wheel acceleration data continuously calculated for a predetermined time interval.

* * * * *